(12) United States Patent
Ishii et al.

(10) Patent No.: US 7,836,200 B2
(45) Date of Patent: Nov. 16, 2010

(54) COMMUNICATION DEVICE, COMMUNICATION METHOD, AND PROGRAM FOR DETERMINING A TRANSMISSION RATE

(75) Inventors: Tomoki Ishii, Osaka (JP); Takao Yamaguchi, Osaka (JP); Atsushi Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/598,260

(22) PCT Filed: Dec. 24, 2008

(86) PCT No.: PCT/JP2008/003917

§ 371 (c)(1),
(2), (4) Date: Oct. 30, 2009

(87) PCT Pub. No.: WO2009/081576

PCT Pub. Date: Jul. 2, 2009

(65) Prior Publication Data

US 2010/0131670 A1 May 27, 2010

(30) Foreign Application Priority Data

Dec. 25, 2007 (JP) ............................. 2007-333002

(51) Int. Cl.
*G06F 15/173* (2006.01)
*G06F 15/16* (2006.01)
(52) U.S. Cl. .................. 709/233; 709/223; 709/230; 709/231; 709/232; 709/234; 709/235
(58) Field of Classification Search ............... None
See application file for complete search history.

(56) References Cited

U.S. PATENT DOCUMENTS

2002/0194361 A1    12/2002    Itoh et al.

(Continued)

FOREIGN PATENT DOCUMENTS

JP             5-260090        10/1993

(Continued)

OTHER PUBLICATIONS

International Search Report issued Jan. 27, 2009 in International (PCT) Application No. PCT/JP2008/003917.

(Continued)

*Primary Examiner*—Hassan Phillips
(74) *Attorney, Agent, or Firm*—Wenderoth, Lind & Ponack, L.L.P.

(57) ABSTRACT

A transmission device includes: a relay device information obtaining unit (101) which obtains self-device transmission status information that is information indicating a transmission status of a communication device; a neighboring communication device determining unit (102) which determines, from other communication devices connected to the network, neighboring communication devices; a neighboring communication device information obtaining unit (103) which obtains another-device transmission status information from each of the neighboring communication devices; a transmission rate control information correcting unit (104) which generates corrected transmission status information based on an amount of statistics calculated from the self-device transmission status information and the another-device transmission status information; a transmission rate determining unit (105) which determines a transmission rate of data, based on the corrected transmission status information; and a data transmission unit (106) which transmits the data according to the determined transmission rate.

9 Claims, 32 Drawing Sheets

U.S. PATENT DOCUMENTS

2006/0240783 A1    10/2006  Kawada
2007/0121523 A1*    5/2007  Morandin ................... 370/252
2007/0127419 A1     6/2007  Sapek
2008/0043625 A1*    2/2008  Cohen et al. ................ 370/236
2008/0310419 A1*   12/2008  Bansal et al. ............ 370/395.6

FOREIGN PATENT DOCUMENTS

| JP | 2001-53781    | 2/2001  |
|----|---------------|---------|
| JP | 2004-235978   | 8/2004  |
| JP | 3588570       | 11/2004 |
| JP | 2005-79827    | 3/2005  |
| JP | 3662907       | 6/2005  |
| JP | 2006-74278    | 3/2006  |
| JP | 2006-303925   | 11/2006 |
| JP | 2007-288471   | 11/2007 |
| WO | 2007/012819   | 2/2007  |

OTHER PUBLICATIONS

A Reply (First) submitted in International Application No. PCT/JP2008/003917 and its English translation.

H. Schulzrinne et al., IETF RFC3550 RTP: A Transport Protocol for Real-Time Applications, Jul. 2003.

D. Hoffman et al., IEFT RFC2250 RTP Payload Format for MPEG1/MPEG2 Video, Jan. 1998.

M. Handley et al., IEFT RFC3448 TCP Friendly Rate Control (TFRC), Jan. 2003.

Search Report issued Jun. 15, 2010 in corresponding European Application No. 08 86 5359.

\* cited by examiner

FIG. 9

HWMP RREQ

| 1 | 1 | 1 | 1 | 1 | 1 | 4 | 6 | 4 | 4 | 1b | 1b | 6b | 6 | 4 |
|---|---|---|---|---|---|---|---|---|---|----|----|----|---|---|
| ID | Length | Mode Flag | TTL | Dst Count | Hop Count | PREQ ID | Src Addr | Src SeqNo | Metric | DO | RF | Res | Dst Addr | Src SeqNo |

HWMP RREP

| 1 | 1 | 1 | 1 | 6 | 4 | 4 | 4 | 6 | 4 |
|---|---|---|---|---|---|---|---|---|---|
| ID | Length | Mode Flag | Src Count | Dst Addr | Dst SeqNo | Life Time | Metric | Src Addr | Src SeqNo |

FIG. 10

| The number of hops to wired AP | Address of relay device | Identification flag |
|---|---|---|
| 1 | Address of MP1 | 0 |
| 2 | Address of MP2 | 0 |
| 3 | Address of MP3 | 1 |
| 4 | Address of MP4 | 0 |

FIG. 12

Request to join sharing group:

| 802.11 Frame Header (Control Frame / Data) | QoS Ctrl | Mesh E2E SeqNo | TTL | Function (JOIN) | seqnum | target node addr (MP-3 addr) | FCS |
|---|---|---|---|---|---|---|---|
| 10 | 2 | 3 | 1 | 2 | 2 | 6 | 4 |

Sharing group member reply:

| 802.11 Frame Header (Control Frame / Data) | QoS Ctrl | Mesh E2E SeqNo | TTL | Function (WELCOME) | seqnum | member node addr (LIST) | FCS |
|---|---|---|---|---|---|---|---|
| 10 | 2 | 3 | 1 | 2 | 2 | 6 | 4 |

FIG. 13

| The number of hops to wired AP | Address of relay device | Identification flag | Address of sharing member |
|---|---|---|---|
| 1 | Address of MP1 | 0 | — |
| 2 | Address of MP2 | 0 | — |
| 3 | Address of MP3 | 1 | Address of CAM2 |
|   |   |   | Address of CAM4 |
| 4 | Address of MP4 | 0 | — |

FIG. 18

| The number of hops to wired AP | Address of relay device | Identification flag | Address of sharing member |
|---|---|---|---|
| 1 | Address of MP1 | 0 | — |
| 2 | Address of MP2 | 2 | Address of CAM2 |
| | | | Address of CAM4 |
| | | | Address of CAM5 |
| 3 | Address of MP3 | 1 | Address of CAM2 |
| | | | Address of CAM4 |
| 4 | Address of MP4 | 0 | — |

FIG. 31  Prior Art

| 1 | 1 | 2 | 2 | 2 | |
|---|---|---|---|---|---|
| TYPE (8) | CODE (0) | CHECKSUM | ID | SEQNUM | DATA |

ICMP Echo Request

| 1 | 1 | 2 | 2 | 2 | |
|---|---|---|---|---|---|
| TYPE (0) | CODE (0) | CHECKSUM | ID | SEQNUM | DATA |

ICMP Echo Reply

FIG. 32  Prior Art

ICMP Echo Request

| TYPE (8) | CODE (0) | CHECKSUM | ID | SEQNUM | SENDTIME |
|---|---|---|---|---|---|
| 1 | 1 | 2 | 2 | 2 | |

ICMP Echo Reply

| TYPE (0) | CODE (0) | CHECKSUM | ID | SEQNUM | SENDTIME |
|---|---|---|---|---|---|
| 1 | 1 | 2 | 2 | 2 | |

US 7,836,200 B2

COMMUNICATION DEVICE, COMMUNICATION METHOD, AND PROGRAM FOR DETERMINING A TRANSMISSION RATE

TECHNICAL FIELD

The present invention relates to a communication device included in a self-distributed system which uses, as a communication infrastructure, a packet exchange network represented by an IP (Internet Protocol) network and a wireless ad hoc network, and which lacks a central device controlling the whole system.

BACKGROUND ART

A UDP (User Datagram Protocol) and a RTP (Real-time Transport Protocol) have been used as a protocol when AV (Audio/Visual) transmission is performed on an intranet connected to the internet and a VPN (Virtual Private Network). The use of the UDP is preferred for the following two reasons. The first reason is that totally depending on an upper-level protocol for packet delivery guarantee makes it possible to realize a light-load transmission and reception process. The second reason is that the delivery guarantee by a retransmission process, which is the main purpose in the use of a TCP (Transmission Control Protocol), inversely becomes a drawback in application where delay of real time reproduction and so on is viewed as a problem.

In real time AV reproduction, when data that does not arrive by a specified time is detected, performing an error concealment process with a reception player minimizes an impact of data loss, and a packet itself is not retransmitted. However, when an impact of network congestion causes packets to be frequently missed, sufficient reproduction quality cannot be guaranteed with the error concealment process. As a result, the following method is used: 1) periodically feeding back a reception status from a reception side to a transmission side; and 2) dynamically adjusting a transmission rate at the transmission side.

RTP (refer to Non-patent References 1 and 2, for example) is a protocol for dividing AV data coded according to, for instance, MPEG (Moving Picture Experts Group) standard into packets and for transmitting the packets. RTP serves to transport packet sequence information necessary for intramedia synchronization and time synchronization information necessary for intermedia synchronization. In addition, RTCP (RTP Control Protocol), which is specified as a part of RTP, serves to feed back quality information gathered at the reception side to the transmission side, and is used for 1). As examples of 2), there are RealMedia™ of RealNetworks, Inc., WindowsMedia™ of Microsoft Corporation, and QuickTime™ of Apple Inc. SureStream in RealMedia™ dynamically switches a coding rate by performing scalable coding with single resolution, depending on a situation at a reception side. Intelligent Streaming of WindowsMedia™ and QTSS optimize a transmission rate by performing adjustment with thinning based on reception quality fed back. Because these schemes using the feedback of the reception quality with RTCP are an end-to-end process, there is a chance that adaptability becomes a problem.

Packet loss occurs at a relay device such as a switch and a router on a path from a source communication device (transmission device) to a destination communication device (reception device). In addition, the packet loss occurs because a rate difference between link layers and concentration of traffics cause a backlog to exceed tolerance. The backlog is a packet that is stacked up in the relay device and is waiting to be relayed. A timing at which the packet loss is detected in the relay device is after all the packets waiting to be relayed are delivered. For this reason, a time lag depending on the length of the backlog impairs the adaptability. A lag of a timing for controlling a transmission rate prevents a traffic status from being adjusted to a status of a temporarily variable network. This inversely worsens a degree of congestion at the relay device and disrupts the stability of the whole system, which causes danger of inviting congestion collapse. In response, Patent Reference 1 discloses a method for improving adaptability by actively checking a status of the relay device at the transmission side.

FIG. 30 is a diagram showing a structure of a system disclosed by Patent Reference 1. The system includes a transmission device 201, relay devices 202 to 204, and a reception device 205, each of which is connected to a network. The system actively gathers a parameter pertaining to an internal status of each of the relay devices 202 to 204 by causing the transmission device 201 to send a probe packet to the relay device. The first probe packet in the figure is a probe packet for gathering a status of the relay device 202, and similarly the second probe packet and the third probe packet are probe packets for gathering statuses of the relay devices 203 and 204, respectively. An example of the parameter to be gathered includes, for instance, an inter-device RTT (round-trip time) or a LOSS (packet loss rate).

RTT on an IP network is measured by using a protocol called ICMP (Internet Control Message Protocol). In other words, a source transmission device transmits a packet called an ICMP Echo Request shown in FIG. 31 to a destination relay device, and at the same time records a sequence number SEQNUM and a transmission time. A reception device having received the ICMP Echo Request duplicates contents of ID, SEQNUM, and DATA stored in the request packet into fields of ID, SEQNUM, and DATA of a reply packet. Subsequently, the reception device sends back the reply packet as an ICMP Echo Reply. The transmission device having received reply data can obtain a transmission time of request data corresponding to the received reply by referring to the content of SEQNUM. Moreover, the RTT is obtained by calculating a difference between the transmission times. Actually, the RTT is often calculated, as an average value in a given amount of time, by continuously transmitting probe packets, so as to improve accuracy. Furthermore, the LOSS is obtained as a ratio of sending back the ICMP Echo Reply to each of transmitted ICMP Echo Requests. A ping is known as a program for performing a series of such operations.

In an example shown in FIG. 31, a given data sequence is stored in DATA. As shown in FIG. 32, however, a time stamp at the time of issuing the ICMP Echo Request is stored into a packet depending on implementation of the ping. In this case, RTT at the time of receiving a reply is calculated when the relay device echoes back the value. Patent Reference 2 describes an example of calculating RTT using a time stamp. Because the RTT and the LOSS vary according to a processing time in the relay device, it is possible to determine an appropriate transmission rate based on the information.

Patent Reference 1 discloses a method for estimating the number of packets stacked up in the relay device based on a link band of each of relay devices and a time change of RTT and for adjusting a rate to a bottleneck under the most loaded condition. With this method, because the transmission rate is controlled at a transmission device side based on a loaded condition estimated from a reply rate of the relay device, which is included in the measured RTT, adaptability is improved as much as a reception device is not involved.

Furthermore, Non-patent Reference 3 shows that conversion into an appropriate transmission rate according to Equation 1 is possible using a measured RTT or LOSS of the reception device. In the equation, R is a transmission rate, MTU is transfer unit length on a path, and T0 is a TCP session timeout period.

$$R = \frac{MTU}{RTT \cdot \sqrt{2 \cdot LOSS/3} + T_0 \cdot (3\sqrt{3 \cdot LOSS/8}) \cdot LOSS \cdot (1 + 32 \cdot LOSS^2)}$$ [Equation 1]

Non-patent Reference 1: IETF RFC3550 RTP: A Transport Protocol for Real-Time Applications Non-patent Reference 2: IETF RFC2250 RTP Payload Format for MPEG1/MPEG2 Video Non-patent Reference 3: IETF RFC3448 TCP Friendly Rate Control (TFRC)

Patent Reference 1: Japanese Patent No. 3662907

Patent Reference 2: Japanese Unexamined Patent Application Publication No. 5-260090

Patent Reference 3: Japanese Patent No. 3588570

DISCLOSURE OF INVENTION

Problems that Invention is to Solve

However, the above-mentioned conventional structure is for optimally controlling a transmission rate by gathering only a status of a relay device on a path where data transmitted by a transmission device passes through and a status of a terminal reception device where the data arrives at. The IP network or the wireless ad hoc network is generally a shared band network where sets of a transmission device and a reception device share network resources including relay devices and plural data concurrently pass through each relay device. Different transmission devices transmit the plural data, and each of source transmission devices performs transmission rate control according to a conventional approach. In such a situation, a sufficient band for data of which transmission has been started when a load of a relay device is light is initially ensured. Next, as another data shared by the relay device starts passing through, an increase in RTT and occurrence of packet discarding start because an output link load becomes heavier and a backlog occurs. The transmission devices do not adjust each other. For this reason, resource contention occurs between the relay devices, one transmission device ensures more bands, and other transmission devices maintain balance with fewer bands. As a result, there has been a problem of causing unfairness in band assignment between the transmission devices. Moreover, when there is a difference in sensitivity of the transmission devices to a change in a transmission status of a relay device, a transmission device highly sensitive to the increase in the RTT decreases its transmission rate sensitively. Furthermore, a lowly sensitive transmission device continues transmission without drastically changing its transmission rate. Consequently, in this case, the unfairness in the band assignment occurs between the transmission devices.

Moreover, as described in Patent Reference 3, there is a method for achieving fair band assignment by causing a management device to equalize, through calculation, a transmission rate of each of transmission devices and by notifying the transmission devices of the equalized transmission rates when transmission is started. Although using this method evenly allocates the transmission rates between the transmission devices, generally, a transmission path differs from transmission device to transmission device and a status of the transmission path also differs completely. For this reason, transmission quality obtained at a reception side becomes uneven between the transmission devices. To put it differently, there has been a problem that a method for simply and evenly allocating the transmission rates between the transmission devices does not achieve fairness in reception quality.

The present invention has been devised to solve the above-mentioned conventional problems. The objects of the present invention are to equalize the reception quality between the reception devices by resolving the resource contention and performing the fair band assignment, and to provide a communication device and so on which realizes high quality data transmission.

Means to Solve the Problems

In order to achieve the above objects, a communication device according to the present invention is a communication device connected to a network and includes: a relay device information obtaining unit which communicates predetermined data with relay devices on a data transmission network path, and obtains, based on a result of the communication of the predetermined data, self-device transmission status information that is information indicating a transmission status of the communication device; a neighboring communication device determining unit which determines, from other communication devices connected to the network, neighboring communication devices from each of which another-device transmission status information that is information indicating a transmission status of a corresponding one of the other communication devices is to be obtained; a neighboring communication device information obtaining unit which obtains the another-device transmission status information from each of the neighboring communication devices; a transmission rate control information correcting unit which generates, as corrected transmission status information, (i) a corrected self-device round-trip time generated by adding, as a round-trip time correction amount, an average between the self-device round-trip time and an another-device round-trip time to a self-device round-trip time and (ii) a corrected frame loss rate generated by adding an average between the self-device frame loss rate and an another-device frame loss rate to a self-device frame loss rate, the self-device round-trip time and the self-device frame loss rate each being an information item included in the self-device transmission status information, and the another-device round-trip time and the another-device frame loss rate each being an information item included in the another-device transmission status information; a transmission rate determining unit which determines a transmission rate of data to be transmitted, based on the corrected transmission status information; and a data transmission unit which transmits the data according to the determined transmission rate.

With this structure, a transmission rate can be determined in consideration of not only a transmission status of a camera device but also transmission statuses of other camera devices sharing a data transmission path. Accordingly, fair band assignment between the communication devices can be achieved. Moreover, reception quality between reception devices is equalized, and high quality data transmission can be achieved.

EFFECTS OF THE INVENTION

According to the present invention, a self-distributed system, which includes no central management mechanism for network resources, incorporates cooperative operations between transmission devices in addition to gathering status information from relay devices. This makes it possible to resolve the resource contention between the transmission devices and realize low-delay and lossless media transmission.

BRIEF DESCRIPTION OF DRAWINGS

FIG. 9 is a diagram showing an example of a frame structure for resolving an address of a relay device on the path in the neighboring communication device determining unit.

FIG. 10 is a diagram showing an example of data structures for storing the addresses of the relay devices on the path in the neighboring communication device determining unit.

FIG. 12 is a diagram showing an example of a frame structure for resolving the addresses of the camera devices sharing the fixed reference point in the neighboring communication device determining unit.

FIG. 13 is a diagram showing an example of a data structure for resolving the addresses of the camera devices sharing the fixed reference point in the neighboring communication device determining unit.

FIG. 18 is a diagram showing an example of a data structure for resolving the addresses of the camera devices sharing the variable reference point in the neighboring communication device determining unit.

FIG. 31 is a diagram showing a format of a transmission status probe packet of a conventional technique.

FIG. 32 is a diagram showing a format of the transmission status probe packet of the conventional technique.

Figure 1:
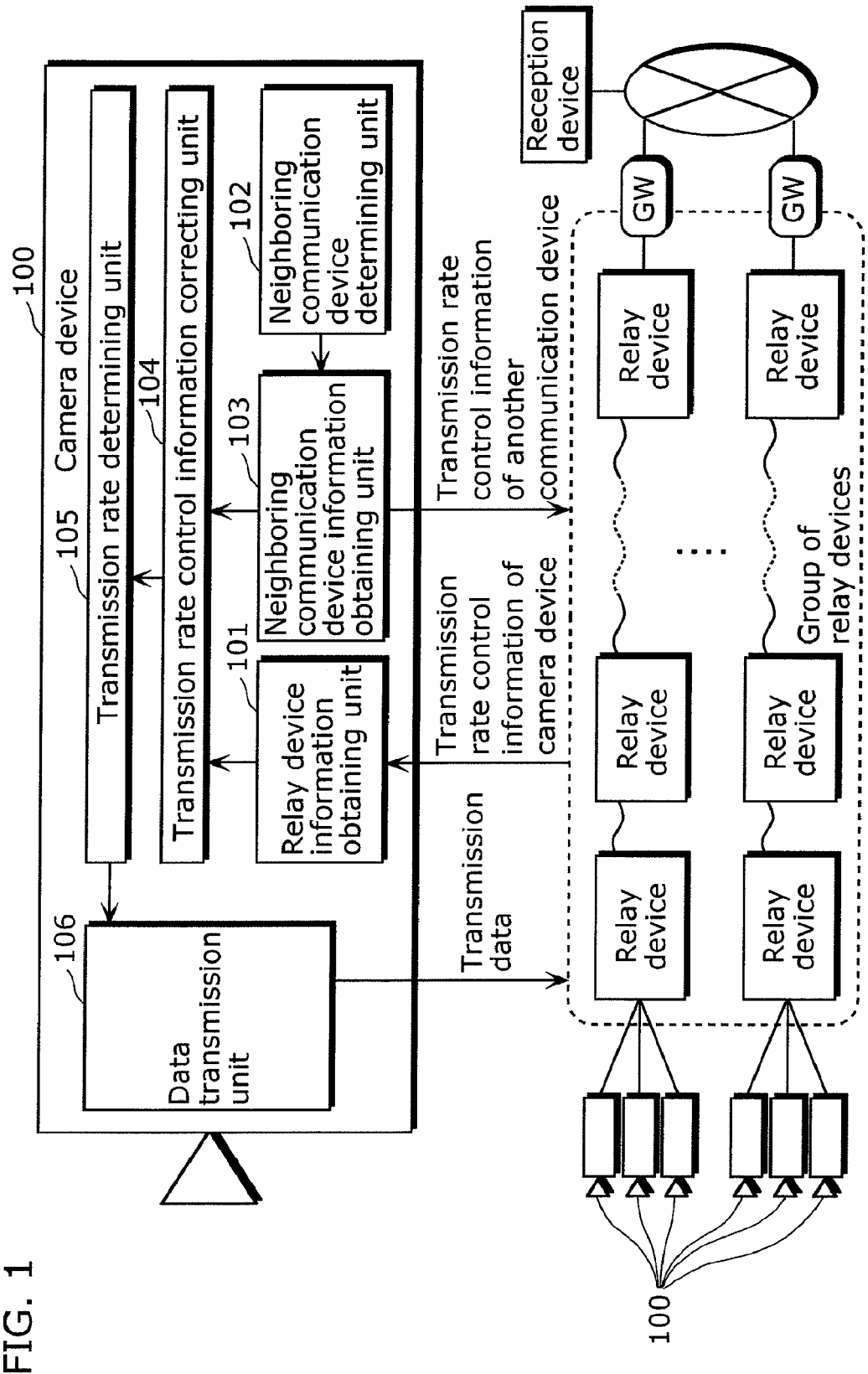
FIG. 1 is a line block diagram showing a camera device according to a first embodiment and a second embodiment of the present invention.

NUMERICAL REFERENCES 100, 300 to 305 Camera device
101 Relay device information obtaining unit
102 Neighboring communication device determining unit
103 Neighboring communication device information obtaining unit
104 Transmission rate control information correcting unit
105 Transmission rate determining unit
106 Data transmission unit
201 Transmission device
202 to 204 Relay device
205 Reception device
CAM1 to CAM8 Camera device
MP1 to MP8, 311 to 314 Relay device
MPP1, MPP2, 320 Wired access point

BEST MODE FOR CARRYING OUT THE INVENTION

The following will describe, as embodiments of the present invention, an example of applying the present invention to a street monitoring camera system using wireless ad hoc nodes.

First Embodiment

Figure 2:
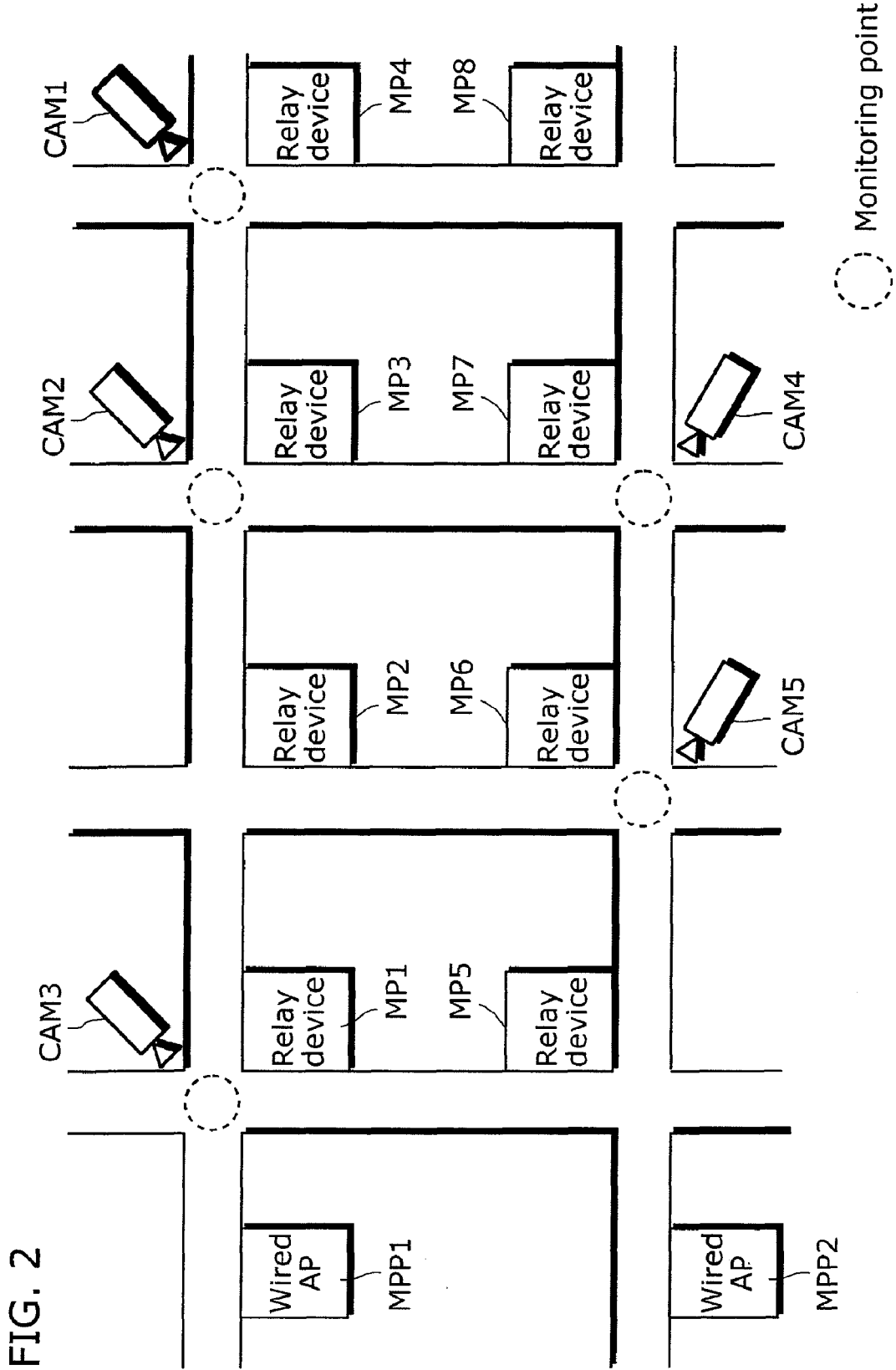
FIG. 2 is a line block diagram showing a street monitoring camera system according to the first and second embodiments.

FIG. 1 is a line block diagram showing the inside of a camera device. FIG. 2 is an overall view of a street monitoring camera system including camera devices each structured as shown in FIG. 1.

In FIG. 2, five intersections out of eight intersections are set as monitoring points, and five camera devices CAM1 to CAM5 are installed. Monitored images shot by the five camera devices are transmitted to a monitoring center (not illustrated) via a wired access point MPP1 or MPP2. For that purpose, relay devices MP1 to MP8 are installed at the eight intersections. The relay devices are included in a multi-hop mesh network for wireless communication that is easily set up. In FIG. 2, an image signal shot by the camera device CAM1 passes through the relay device MP4, the relay device MP3, the relay device MP2, and the relay device MP1 in this order, and reaches the wired access point MPP1. The image signal is media converted into a signal in a wired network such as a ground IP network, and then the signal is delivered to a terminal of the monitoring center which is connected ahead of the wired network. Furthermore, an image signal shot by the camera device CAM2 passes through the relay device MP3, the relay device MP2, and the relay device MP1 in this order, and reaches the wired access point MPP1. The image signal is then delivered to the terminal of the monitoring center via a ground network such as a wire. Moreover, an image signal shot by the camera device CAM3 passes through the relay device MP1 and the relay device MP5 in this order, and reaches the wired access point MPP2. The image signal is then delivered to the terminal of the monitoring center via the ground network such as the wire. Furthermore, an image signal shot by the camera device CAM4 passes through the relay device MP7, the relay device MP3, the relay device MP2, and the relay device MP1 in this order, and reaches the wired access point MPP1. The image signal is then delivered to the terminal of the monitoring center via the ground network such as the wire. Moreover, an image signal shot by the camera device CAM5 passes through the relay device MP6, the relay device MP2, and the relay device MP1 in this order, and reaches the wired access point MPP1. The image signal is then delivered to the terminal of the monitoring center via the ground network such as the wire. In the line block diagram shown by FIG. 2, there are two factors for deterioration in the quality of image signals as indicated below. The passing of the image signals, which are transmitted by the camera devices CAM1, CAM2, and CAM4, together through the relay devices MP1, MP2, and MP3 causes relay resource contention on the relay devices MP1, MP2, and MP3. Furthermore, the passing of the image signals, which are transmitted by the camera devices CAM1, CAM2, CAM4, and CAM5, together through the relay devices MP1 and MP2 causes relay resource contention on the relay devices MP1 and MP2. Moreover, the passing of the image signals, which are transmitted by the camera devices CAM1, CAM2, CAM3, CAM4, and CAM5, together through the relay device MP1 causes relay resource contention on the relay device MP1. The first factor for deterioration in the quality of image signals is a deficiency of relay buffers caused by a confluence of such image signal flows. Although a position of a relay device to be congested by the confluence of the flows varies depending on a flow condition, specifying a position at each of points in time makes it possible to use the position as a reference point for recognizing a path condition.

Figure 3:
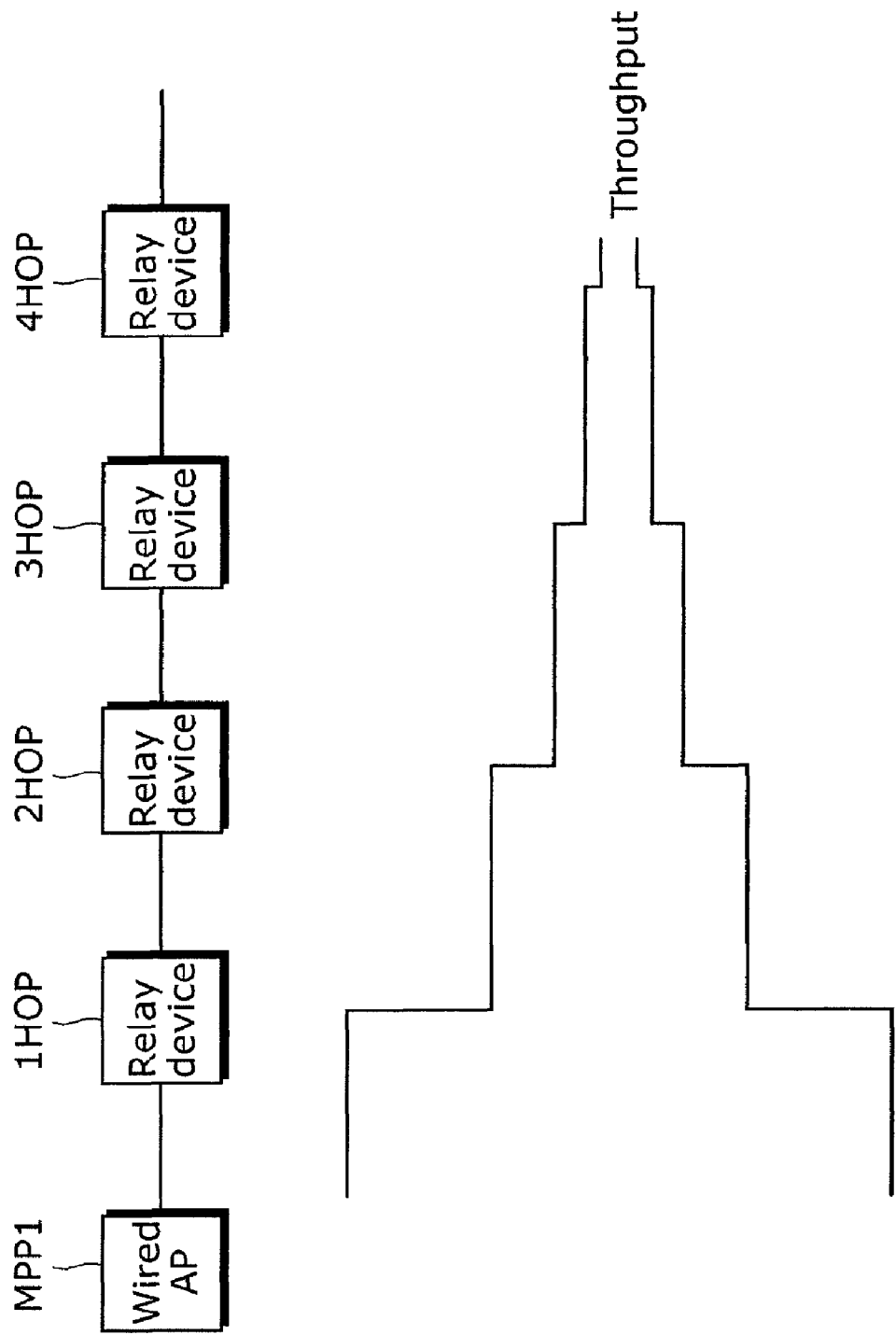
FIG. 3 is a diagram showing a relationship between the number of hops and throughput.

On the other hand, in the multi-hop mesh network, a decrease in a line utilization rate depending on the number of hops of a relay device occurs. In FIG. 2, the relay device MP1 is 1 hop away from a broadband wired access point, and the relay devices MP2, MP3, and MP4 are 2 hops, 3 hops, and 4 hops away from the broadband wired access point, respectively. Here, a simple assumption is made that each of neighboring relay devices and wired access points are installed at an equal distance, and a data transmission range and a carrier sense range are from each relay device to a corresponding one of the neighboring relay devices. In this way, it is always possible to transmit a frame from the relay device MP1 to the wired access point MPP1. On the other hand, it is not possible to perform transmission from the relay device MP2 to the wired access point MPP1 while the relay device MP1 is transmitting data to the wired access point MPP1 because of interference avoidance. For this reason, opportunities to perform the transmission from the relay device MP2 to the wired access point MPP1 become fewer in comparison with opportunities to perform the transmission from the relay device MP1 to the wired access point MPP1. In addition, it is not possible to perform data transmission from the relay device MP3 to the wired access point MPP1 while the relay device MP2 is transmitting data to the relay device MP1, and opportunities of the relay device MP3 to perform the transmission become fewer than those of the relay device MP2. When the number of hops is plural as stated above, the line utilization rate is decreased in comparison with a communication band fundamentally provided by a wireless line. FIG. 3 shows a relationship between the number of hops and throughput.

Furthermore, in a situation where flows following different transmission paths intersect each other, the decrease in the line utilization rate caused by a collision between communication devices which attempt to perform transmission to a relay device at an intersection. Because a sufficient communication rate is ensured for a relay device (for example, the relay device MP1 or MP2 shown in FIG. 3) near a wired access point, such throughput differences between the relay devices do not matter. However, a data transmission rate is rate-controlled in a relay device (for instance, the relay device MP3 or MP4 shown in FIG. 3) far from the wired access point. Accordingly, image signals transmitted via each relay device are congested, which is the second factor for the deterioration of the quality.

A case is considered where IEEE (Institute of Electrical and Electronic Engineers) 802.11a is used as a lower layer of IEEE 802.11s. A transmission rate in compliant with the standard is 54 Mbps. In linear multi-hop communication as shown in FIG. 3, a monitoring camera is assumed to transmit an image signal at typical 3 Mbps or so via each relay device. In this case, the relay device MP3 that is located at 3 hops from the wired access point is at highest risk for congestion and is a reference point where an influence on deterioration in the quality of a transmission signal is the strongest. On the other hand, congestion does not occur in the relay devices MP1 and MP2 that are located at few hops from the wired access point, and the influence of the relay device MP3 starts congestion in the relay device MP4. In such a situation, it is not necessary to measure statuses of all the relay devices to detect the congestion on the path, and a transmission status of the path is estimated by measuring a relay device as a unique point that is most sensitive to the congestion. The position of the reference point is related to a transmission rate provided by a wireless portion of a protocol to be used and an output data rate of a camera device that transmits an image signal via each relay device. Consequently, as the street monitoring camera system of the present embodiment, the position of the reference point is fixed depending on a system application.

Figure 4:
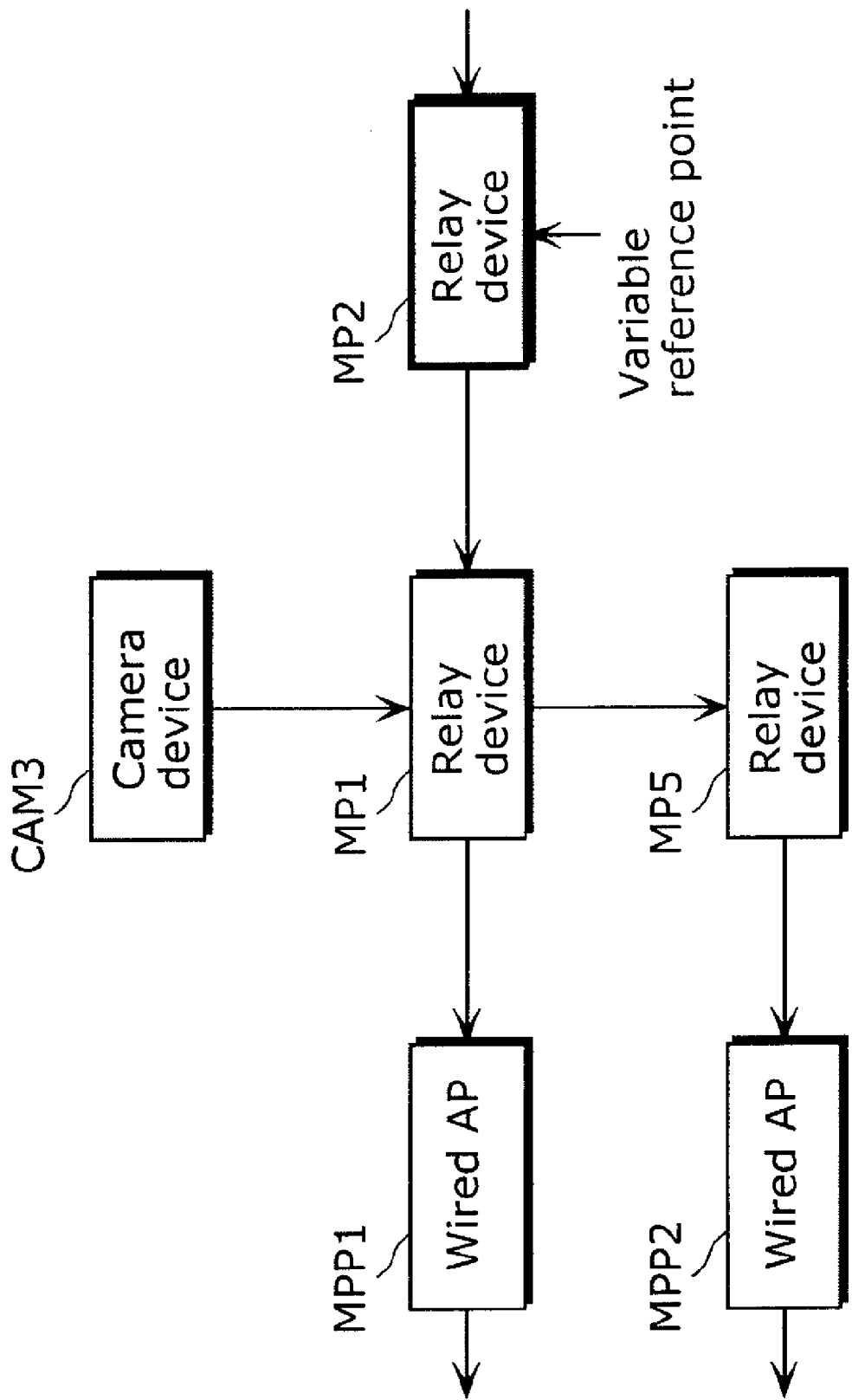
FIG. 4 is a schematic diagram showing a variable reference point.
Figure 5:
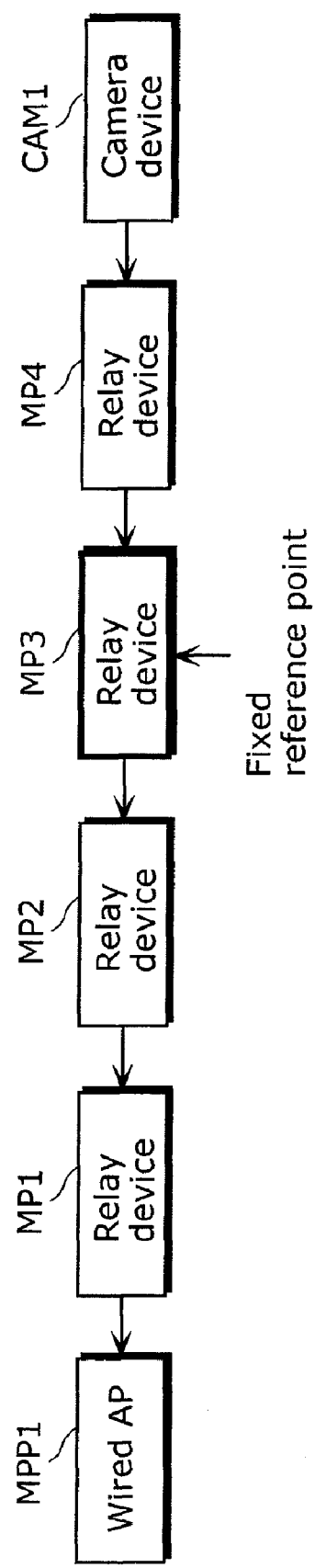
FIG. 5 is a schematic diagram showing a fixed reference point.

Although each camera device may measure only either the variable reference point mentioned in the description of the first factor or the fixed reference point mentioned in the description of the second factor, so as to recognize a transmission status on a transmission path, it is desirable to measure the both. FIG. 4 shows a method for specifying a variable reference point to be measured. An image signal whose relay source is the relay device MP2 is transmitted via the relay device MP1 to the wired access point MPP1. An image signal whose transmission source is the camera device CAM3 is transmitted via the relay device MP1 to the wired access point MPP2. These image signals having different transmission directions intersect with each other at the relay device MP1, and increase a transmission load of the relay device MP1. For this reason, a backlog of the relay device MP2 attempting to transmit data to the relay device MP1 increases (the number of packets to be relayed exceeds tolerance). As a result, it is effective to control a transmission rate depending on a result of measuring a transmission status of the relay device MP2. FIG. 5 shows a method for specifying a fixed reference point to be measured. It is effective to determine the fixed reference point (the relay device MP3) with the number of hops from the wired access point according to the change in the line utilization rate shown in FIG. 3, and to control a transmission rate depending on a result of measuring a transmission status of the relay device MP3.

FIG. 1 shows a structure of each of the camera devices CAM1 to CAM5 shown in FIG. 2. A camera device 100 includes a relay device information obtaining unit 101, a neighboring communication device determining unit 102, and a neighboring communication device information obtaining unit 103. The camera device 100 further includes a transmission rate control information correcting unit 104, a transmission rate determining unit 105, and a data transmission unit 106.

The relay device information obtaining unit 101 measures a transmission status of a relay device on a transmission path of an image signal transmitted from the camera device 100. The neighboring communication device determining unit 102 identifies other camera devices sharing the relay device on the transmission path. The neighboring communication device information obtaining unit 103 gathers transmission statuses of neighboring camera devices (the other camera devices identified by the neighboring communication device determining unit 102). The transmission rate control information correcting unit 104 corrects a transmission status of a path of the camera device 100 obtained by the relay device information obtaining unit 101, that is, a transmission status of the relay device on the transmission path, with the transmission statues of the other neighboring camera devices gathered by the neighboring communication device information obtaining unit 103 so that transmission rates are fairly allocated between the neighboring camera devices. The transmission rate determining unit 105 determines a code rate of an image signal of a shot image, based on corrected transmission rate control information obtained through the correction performed by the transmission rate control information correcting unit 104. The data transmission unit 106 codes and transmits the image signal using, as a target rate, the transmission rate determined by the transmission rate determining unit 105.

Figure 6:
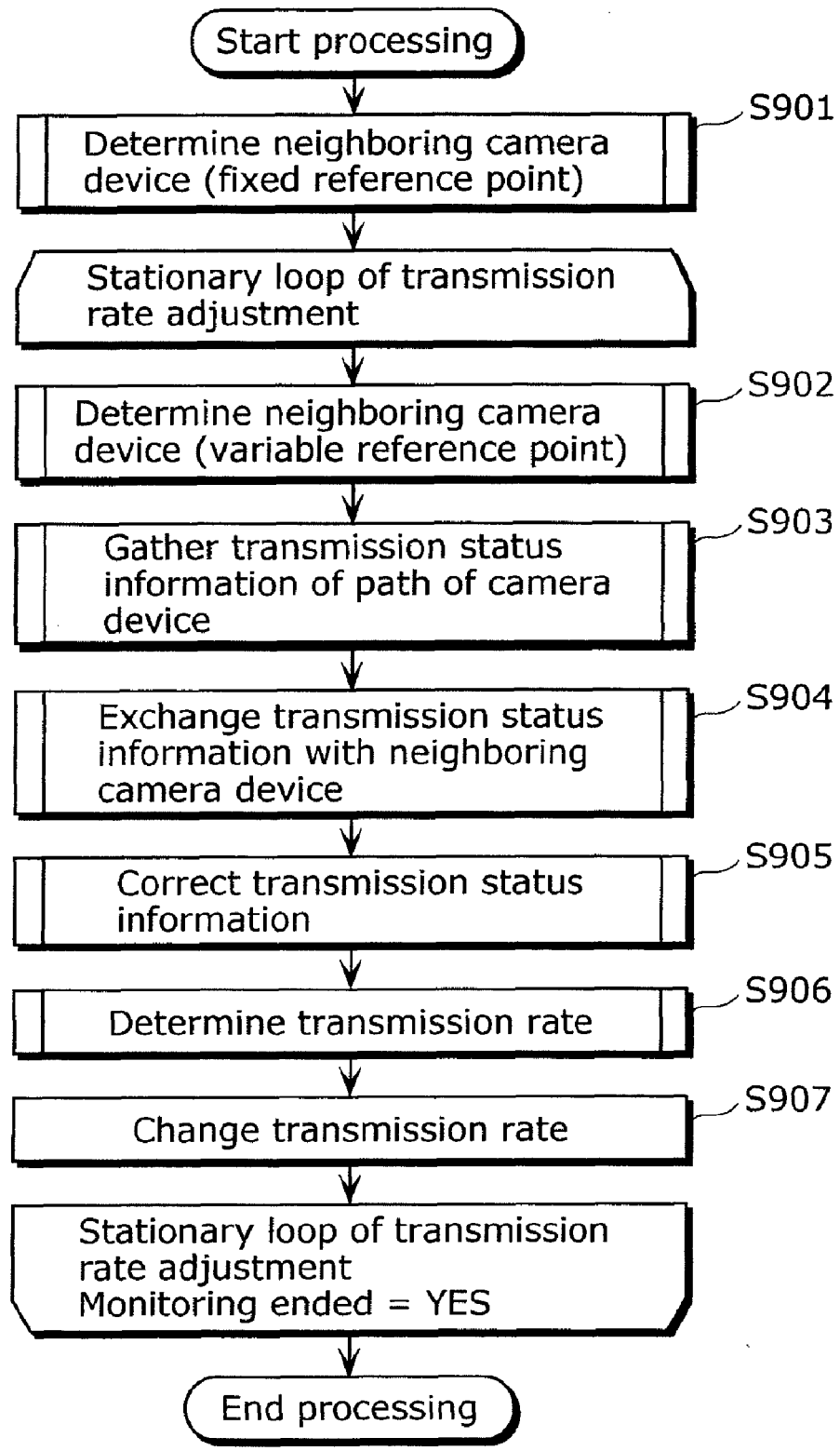
FIG. 6 is a flow chart showing processes of the camera device according to the first embodiment of the present invention.

FIG. 6 is a flow chart showing processes of the camera devices CAM1 to CAM5 each having the structure of the camera device 100. Upon starting a monitoring operation, the neighboring communication device determining unit 102 specifies a relay device to be a fixed reference point, and causes the camera device 100 to be ready for communication by listing neighboring camera devices sharing the fixed reference point (S901). In a stationary loop of transmission rate adjustment, the neighboring communication device determining unit 102 updates a position of a variable reference point that varies depending on a flow condition. Furthermore, the neighboring communication device determining unit 102 causes the camera device 100 to be ready for communication by listing neighboring camera devices sharing the variable reference point (S902). The relay device information obtaining unit 101 gathers transmission status information that is information indicating the transmission statuses of the fixed reference point and the variable reference point on a path of the camera device 100 (S903). The neighboring communication device information obtaining unit 103 exchanges the gathered information with each of the neighboring camera devices (S904). The transmission rate control information correcting unit 104 corrects the transmission status information gathered on the path of the camera device 100 based on transmission status information exchanged with each neighboring camera device (S905). The transmission rate determining unit 105 converts the corrected transmission status information into a transmission rate (S906). The transmission rate determining unit 105 changes a transmission rate by resetting the data transmission unit 106 to use the converted transmission rate as a target rate (S907). The processes S902 to S907 are repeated until the camera device is turned off.

Hereinafter, although the camera device CAM1 shown in FIG. 2 is used for convenience of description, the structure and operations thereof are the same for the other camera devices CAM2 to CAM5.

(Neighboring Communication Device Determining Unit 102)

Figure 7:
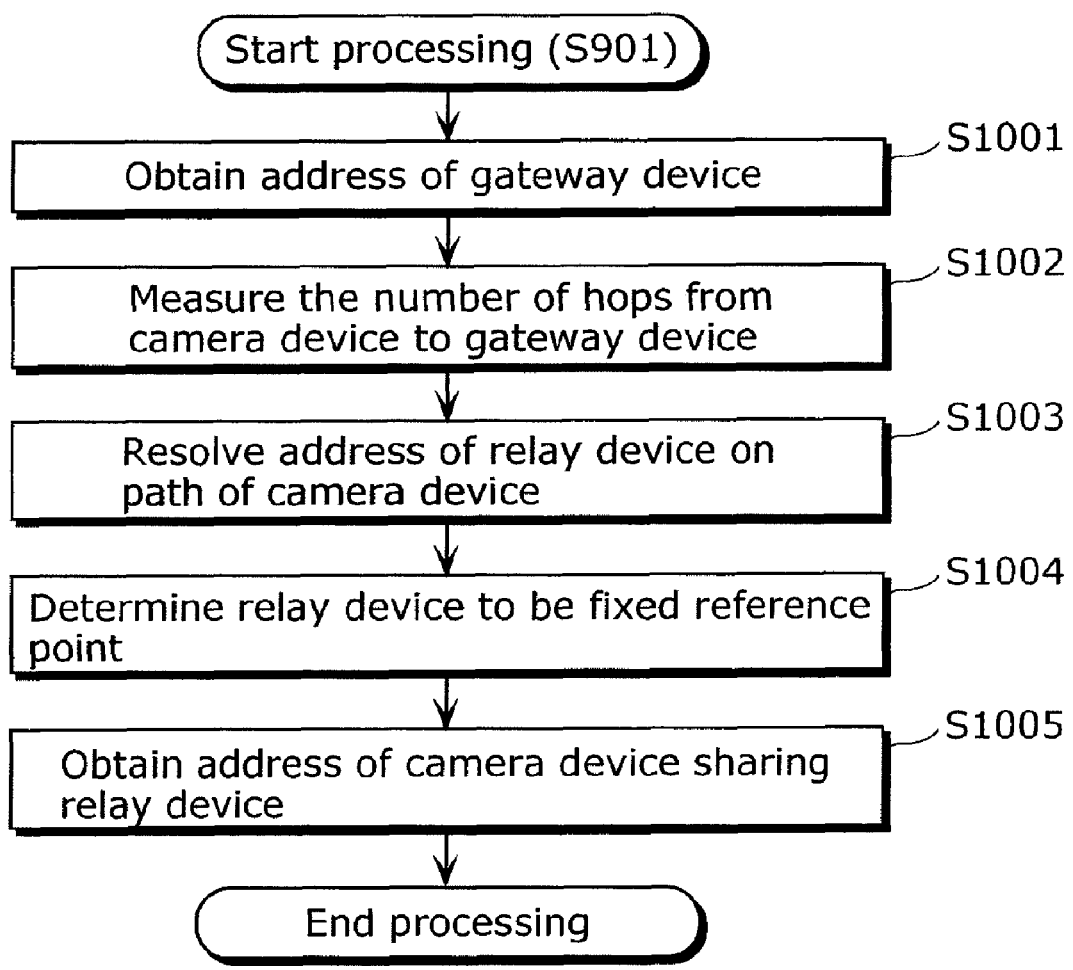
FIG. 7 is a flow chart showing processes of determining a fixed reference point in a neighboring communication device determining unit.

FIG. 7 is a flow chart showing the process (S901) of determining a fixed reference point.

The neighboring communication device determining unit 102 obtains an address of a gateway device (S1001), and measures the number of hops from the camera device CAM1 to the gateway device (S1002). Moreover, the neighboring communication device determining unit 102 resolves addresses of relay devices on a path of the camera device CAM1 (S1003), and determines a relay device to be a fixed reference point (S1004). Further, the neighboring communication device determining unit 102 obtains an address of a camera device sharing the determined relay device (S1005).

The following will describe the fixed reference point determination process in detail. The gateway device is a wired access point to which the camera device CAM1 is supposed to transmit data, and the wired access point is the wired access point MPP1 when a communication device is the camera device CAM1. An address of the wired access point MPP1 is pre-set inside of the camera device CAM1 as a preference of the camera device CAM1. The neighboring communication device determining unit 102 obtains the pre-set wired access point MPP1. As a method other than the above, the neighboring communication device determining unit 102 may obtain the address of the wired access point MPP1 from a server using a directory service and so on, or select it from among addresses held accordingly.

Figure 8:
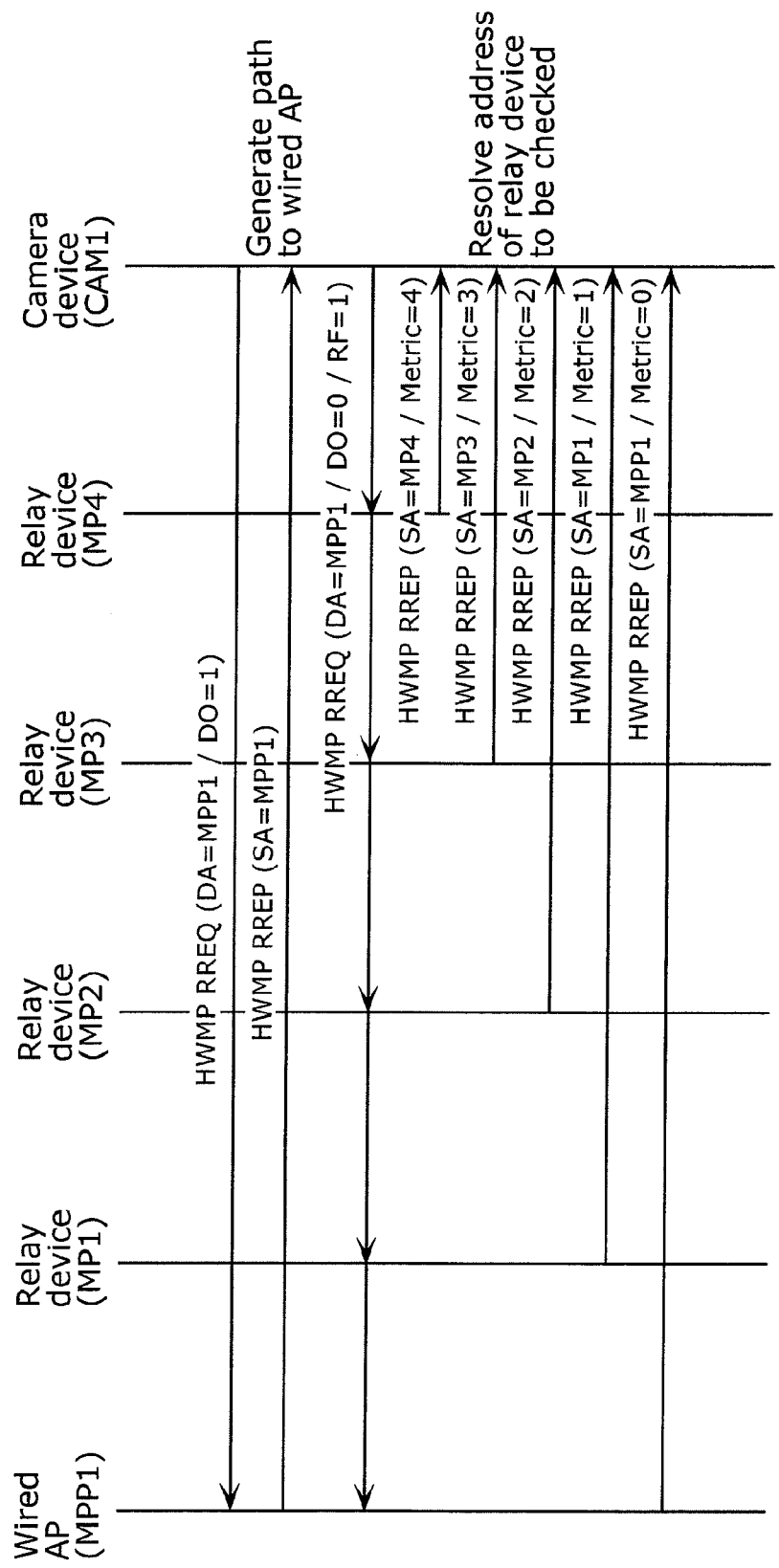
FIG. 8 is a diagram showing an example of a scheme for resolving addresses of relay devices on a path in the neighboring communication device determining unit.

FIG. 8 shows a scheme for using HWMP, a routing protocol implemented in IEEE 802.11s, so that the neighboring communication device determining unit 102 measures the number of hops from the camera device CAM1 to the wired access point MPP1. Moreover, FIG. 9 shows a format of a packet to be transmitted and received. In the figure, RREQ is a request packet for path information regarding a path to a transmission destination, and RREP is a reply packet. As shown in FIG. 8, the camera device CAM1 issues, to the wired access point MPP1, RREQ in which a field of Destination Only (DO) is set. This enables the camera device CAM1 to directly receive RREP from the wired access point MPP1. In addition, at this time, route information is generated in each relay device on the path. Subsequently, the camera device CAM1 issues, to the wired access point MPP1, RREP in which a field of Reply-and-Forward (RF) is set. Each relay device on the path replies generated path information with RREP while forwarding RREQ. Accordingly, all the relay devices on the path reply RREP. When the number of hops is used as a routing metric, the number of hops from each relay device to the wired access point MPP1 is stored in Metric field of RREP. Consequently, an arrangement of the relay devices on the path can be found with SrcAddr and Metric. When the number of hops is not used as the routing metric, each relay device transmits a frame to the wired access point MPP1 while sequentially increasing a field of TTL, and receives RREP. This allows a method for tracing a path to be used.

Topology information of the camera device CAM1 obtained in the above manner is recorded in a sharing group table in the camera device CAM1. FIG. 10 shows an example of data structures in the sharing group table. A default value of an identification flag in the figure is 0. Because the relay device MP3 is set as the fixed reference point due to the number of hops from the wired access point, an identification flag indicates 1.

Figure 11:
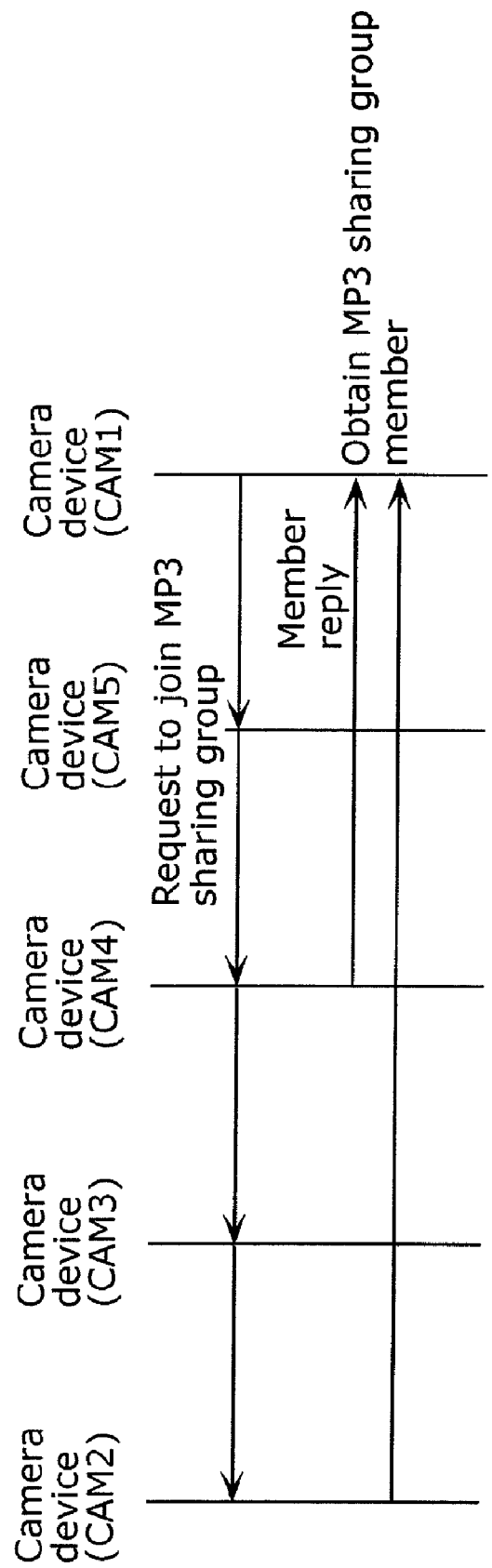
FIG. 11 is a diagram showing an example of a scheme for resolving addresses of camera devices sharing a fixed reference point in the neighboring communication device determining unit.

FIG. 11 shows a process flow for resolving (S1005) an address of another camera device sharing a fixed reference point. FIG. 12 shows a format of a frame to be transmitted and received. The camera device CAM1 stores JOIN in function field, generates a unique sequence ID, and stores the generated unique sequence ID in seqnum field. In addition, the camera device CAM1 stores the address of the fixed reference point in target node addr field. Further, the camera device CAM1 transmits, to ff:ff:ffiff:ff:ff, a broadcast address, a request to join sharing group. The relay device MP3 becomes a fixed reference point on the path from the camera device CAM1 to the wired access point MPP1. For this reason, the address of the relay device MP3 is stored into target node addr field. In FIG. 2, as a camera device having the relay device MP3 located at 4 hops from the wired access point and a camera device having the relay device MP3 located at 5 hops from the wired access point, the camera devices CAM2 and CAM4 exist respectively. The camera device CAM2 transmits an image signal to the wired access point MPP1, using the relay devices MP3, MP2, and MP1 as a path. The camera device CAM4 also transmits an image signal to the wired access point MPP1, using the relay devices MP7, MP3, MP2, and MP1 as a path. The relay device MP3 is recorded, as a relay device address, in a sharing group table recorded in each of the camera devices CAM2 and CAM4, and an identification flag is set to 1. The camera devices CAM2 and CAM4 each send back a sharing group member reply to the request to join sharing group of the camera device CAM1 by referring to the own sharing group table. On the other hand, because the camera devices CAM3 and CAM5 each do not have the relay device MP3 on a path, transmission is not performed. With the sharing group member reply, WELCOME is stored into function field, and a request frame and a reply frame are associated with each other. As a result, seqnum stored in the request frame is duplicated. Moreover, the address of each of the camera devices CAM2 and CAM4, which is the transmission source of the reply, is stored into member node addr field. The camera device CAM1 receiving the sharing group member reply from each of the camera devices CAM2 and CAM4 recognizes the camera devices CAM2 and CAM4 as other cameras sharing the relay device MP3 as the fixed reference point. As shown in FIG. 13, information regarding the above is recorded into sharing member field of the sharing group table. Although no replay is obtained when there is no camera device sharing a fixed reference point to be targeted, the camera device CAM1 avoids this by timing out the processing by setting a certain waiting time.

Figure 14:
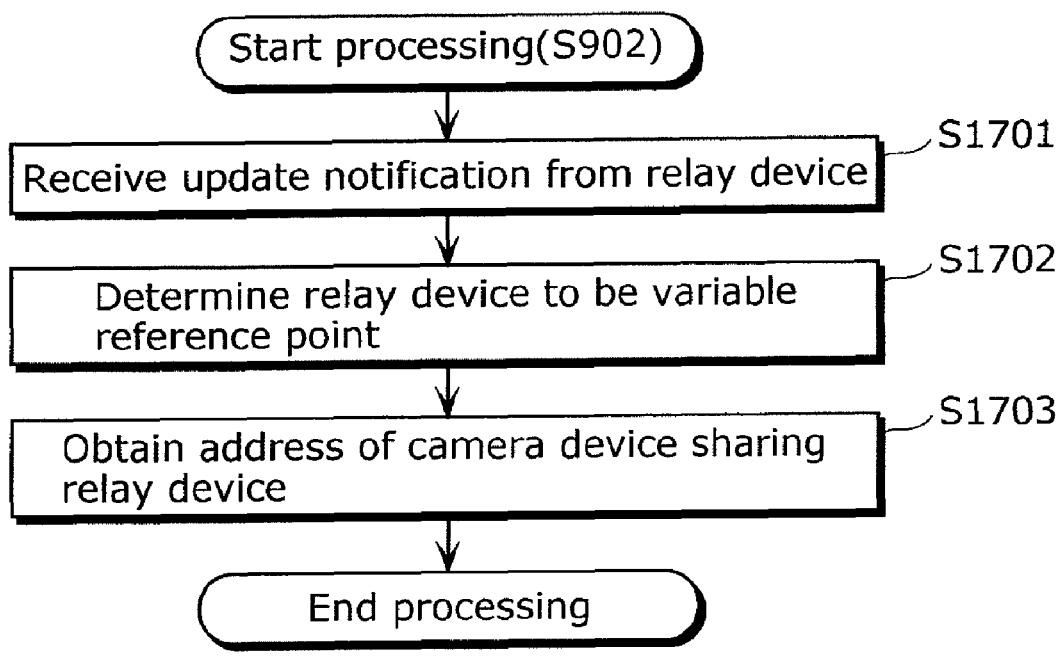
FIG. 14 is a flow chart showing processes of determining a variable reference point in the neighboring communication device determining unit.
Figure 15:
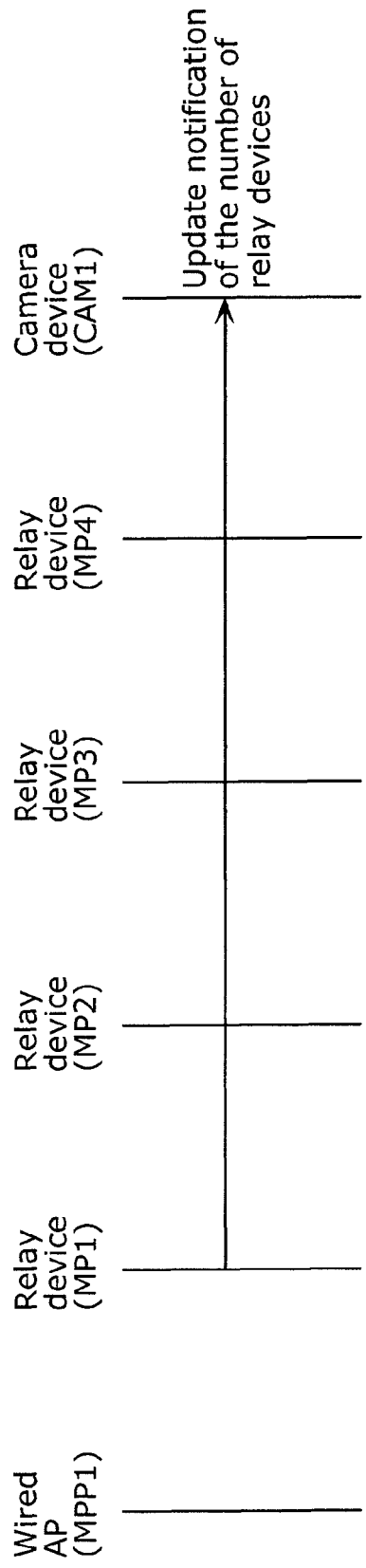
FIG. 15 is a diagram showing an example of a scheme for detecting a variable reference point in the neighboring communication device determining unit.
Figure 16:
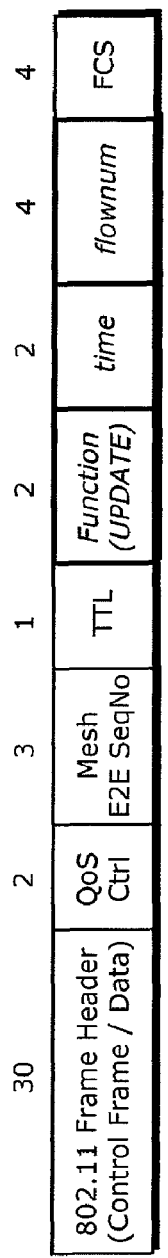
FIG. 16 is a diagram showing an example of a frame structure for detecting the variable reference point in the neighboring communication device determining unit.

Because, unlike a fixed reference point, a variable reference point varies depending on a dynamic change in an image signal flowing on a mesh network, the variable reference point is determined in a stationary loop process of the transmission rate adjustment shown in FIG. 6. FIG. 14 shows a flow chart of the process (S902) of determining a variable reference point. FIG. 15 shows a process flow between the devices. FIG. 16 shows an example of a format of a frame to be transmitted and received.

The neighboring communication device determining unit 102 receives, from a relay device, an update notification of the number of downstream relay devices (S1701). Upon receiving the update notification, the neighboring communication device determining unit 102 determines a relay device to be a variable reference point (S1702). In addition, the neighboring communication device determining unit 102 obtains an address of a camera device sharing the relay device (S1703).

The following will describe the variable reference point determination process in detail. Each of relay devices forwards image signals transmitted from an upstream to an appropriate downstream relay device according to transmission source information of the respective image signals. Each relay device easily recognizes an address of a corresponding one of camera devices which is a transmission source of an image and the number of the downstream relay devices. When the number of the relay devices changes, the relay device issues a frame shown in FIG. 16 to the corresponding one of the camera devices, which is the transmission source of a corresponding one of the image signals. This allows a change in a flow condition to be dynamically notified to a concerned camera device.

In FIG. 2, it is assumed that the camera device CAM3 has stopped shooting, and is not in an image transmission state. A situation is considered where the other camera devices are in a monitoring state, and are transmitting image signals. At this moment, image signals relayed by the relay device MP1 are four image signals transmitted by the camera devices CAM1, CAM2, CAM4, and CAM5. Because all the transmission destinations of the image signals are the wired access point MPP1, the number of downstream relay devices (in this case, not a relay device but a wired AP) is 1.

Next, when the camera device CAM 3 enters the monitoring state to shoot an image signal and starts transmitting the shot image signal to the wired access point MPP2, the image signal passes through the relay device MP1. A transmission destination of the image signal transmitted by the camera device CAM3 is not the wired access point MPP1 but is the relay device MP5 leading to the wired access point MPP2. Consequently, the number of the downstream relay devices (the relay device MP5 and the wired access point MPP2) increases to 2. Here, the relay device MP1 issues an update notification of the number of the downstream relay devices shown in FIG. 16 to each of the camera devices CAM1, CAM2, CAM3, CAM4, and CAM5, which is a transmission source of a corresponding one of image signals. UPDATE is stored into function field, a time at which a change has occurred is stored into time field, and 2, the number of the downstream relay devices, is stored into flownum field.

Figure 17:
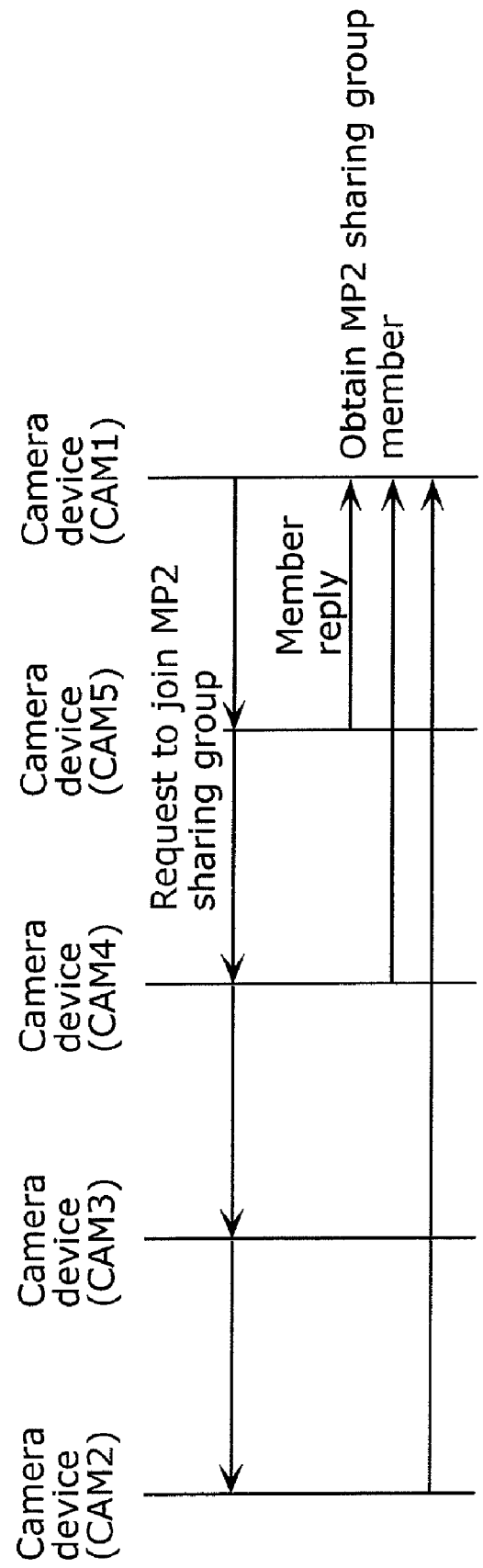
FIG. 17 is a diagram showing an example of a scheme for resolving addresses of camera devices sharing a variable reference point in the neighboring communication device determining unit.

The camera device CAM 1 can detect that intersection flows of the image signals occur at the relay device MP1 on a self-transmission path, by receiving the notification. As shown in FIG. 4, the relay device MP2 that transmits data to the relay device MP1 which processes the intersection flows becomes a variable reference point. As shown in FIG. 17, the camera device CAM1 resolves addresses of other camera devices sharing the relay device MP2 on the path, by performing the same process as the process of generating the sharing group for the fixed reference point. FIG. 18 shows a sharing group table in which a variable reference point is recorded and 2, which is a value indicating the variable reference point with an identification flag for the relay device MP2, is recorded. Furthermore, the camera devices CAM2, CAM4, and CAM5, each of which sends back a member reply, are recorded as sharing members of the relay device MP2. Moreover, a relay device that is the variable reference point needs to transmit an update notification to a concerned neighboring camera device not only when the number of the downstream relay devices increases but also when the number of the same decreases due to suspension of a flow. A camera device receiving an update notification in which the number of relay devices is 1 removes a variable reference point from a sharing group table by resetting an identification flag for the variable reference point in the sharing group table and clearing an address of a sharing member.

(Relay Device Information Obtaining Unit 101)

Figure 19:
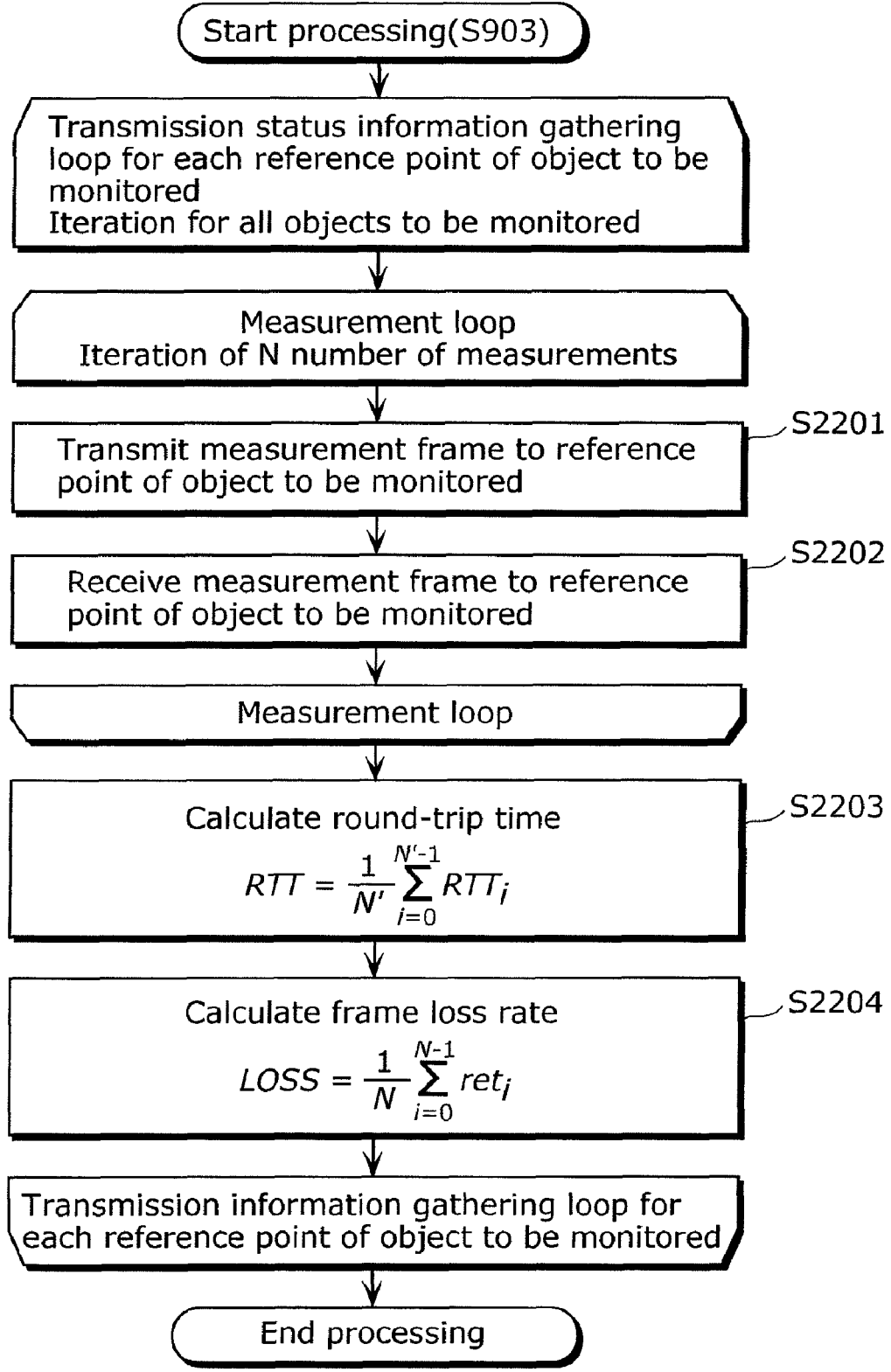
FIG. 19 is a flow chart showing processes of a relay device information obtaining unit.
Figure 20:
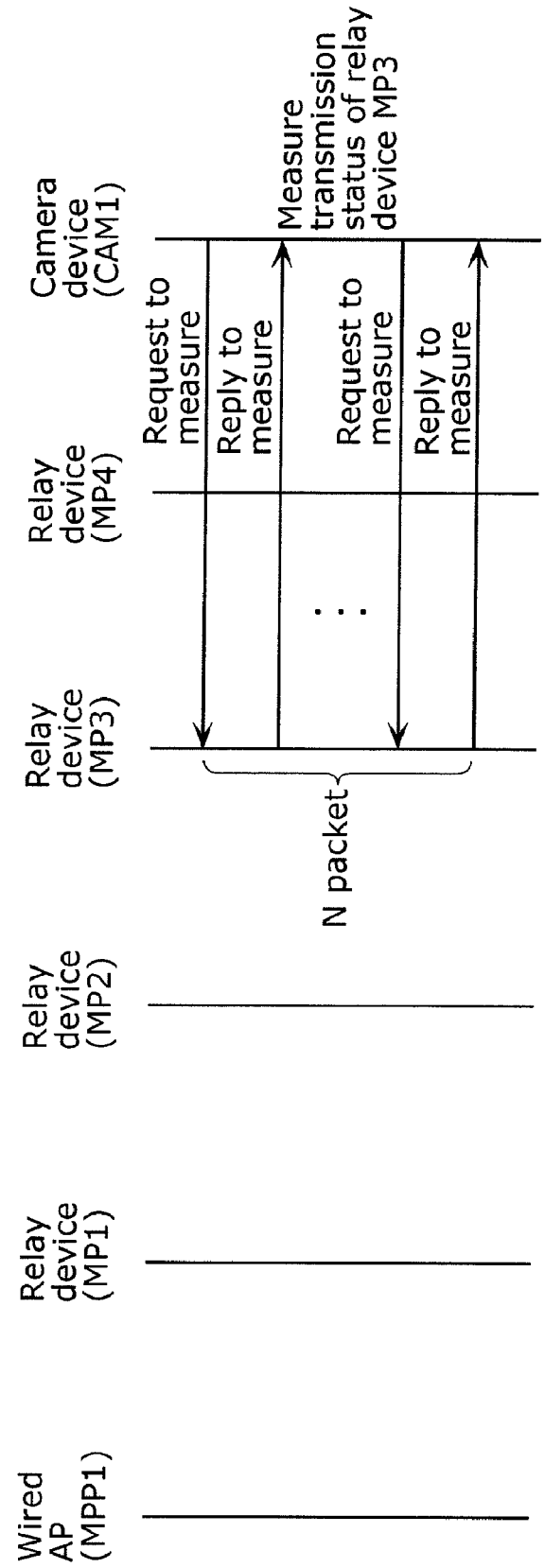
FIG. 20 is a diagram showing an example of a scheme for gathering transmission status information of a relay device in the relay device information obtaining unit.
Figure 21:
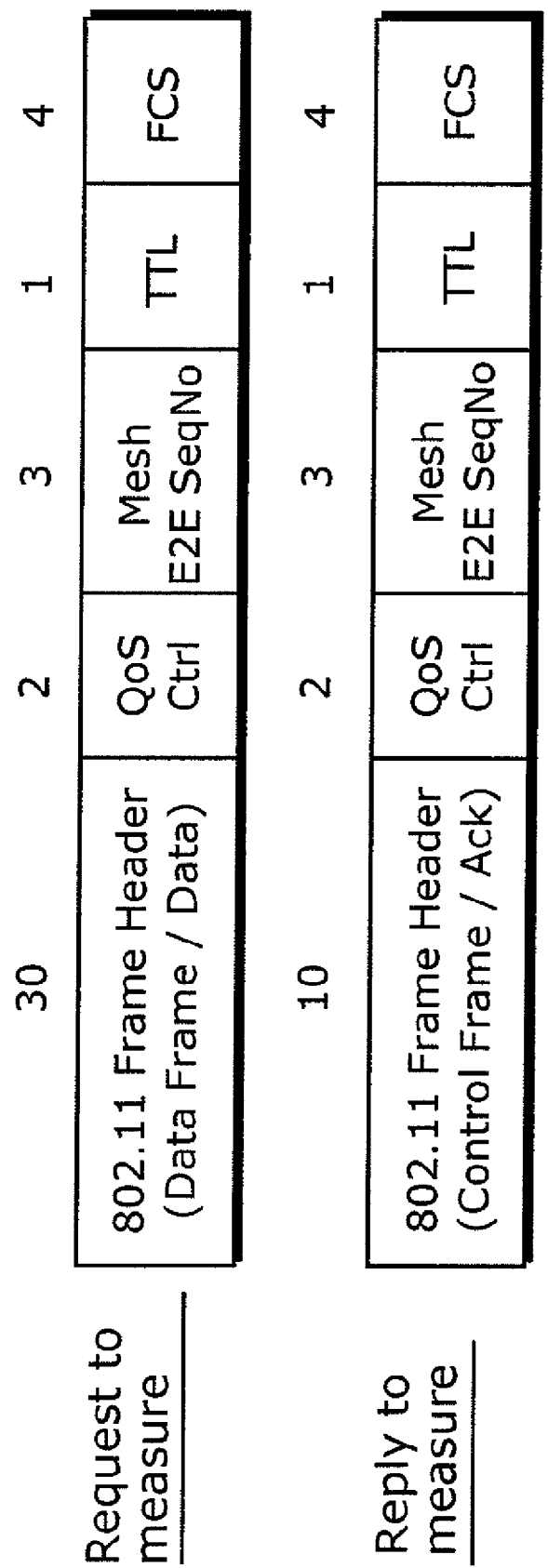
FIG. 21 is a diagram showing an example of a frame structure for gathering the transmission status information of the relay device in the relay device information obtaining unit.

FIG. 19 shows a flow chart of the process (S903) of gathering transmission status information of a path of the camera device CAM1. The process is an iteration process performed for all the reference points recorded in the sharing group table. Target reference points include both a fixed reference point for which 1 is recorded as an identification flag and a variable reference point for which 2 is recorded as an identification flag. An N number of measurement frames are transmitted to each reference point (S2201). FIG. 20 shows a pattern of a transmission status measurement with respect to the relay device MP3 that is the fixed reference point. FIG. 21 shows an example of a frame format used for a measurement frame request or reply. The camera device CAM1 transmits a measurement request to the relay device MP3 and at the same time records a transmission time (S2202). Although the relay device MP3 sends back a measurement reply to the measurement request, the relay device MP3 sends back the measurement reply after processing a backlog when the backlog occurs in the relay device MP3. For this reason, RTT (round-trip time) that is obtained by subtracting the recorded transmission time from a time when the camera device CAM1 receives the reply includes a process delay time of the relay device MP3. A value calculated according to Equation 2 from a round-trip time in the case where the N number of the measurement frames are issued is defined as RTT of the relay device MP3 at the time of the measurement.

$$RTT = \frac{1}{N} \cdot \sum_{i=0}^{N'-1} RTT_i \quad \text{[Equation 2]}$$

Here N' is the number of times a measurement reply is obtained out of the number of measurements, and $RTT_i$ is a round-trip time obtained at the i-th measurement. LOSS, a frame loss rate, can be calculated according to Equation 3.

$$LOSS = \frac{1}{N} \sum_{i=0}^{N-1} ret_i \quad \text{[Equation 3]}$$

Here, N is the number of the measurements. $ret_i$ indicates a reception status of the measurement reply to a measurement request frame transmitted for the i-th time, and is a value set to 1 in a turn when the reply is obtained and to 0 in a turn when the reply is not obtained. As with the relay device MP3 that is the fixed reference point, the relay device MP2 that is a variable reference point is measured, and RTT and LOSS are calculated for each of reference points (S2203, S2204).

(Neighboring Communication Device Information Obtaining Unit 103)

Figure 22:
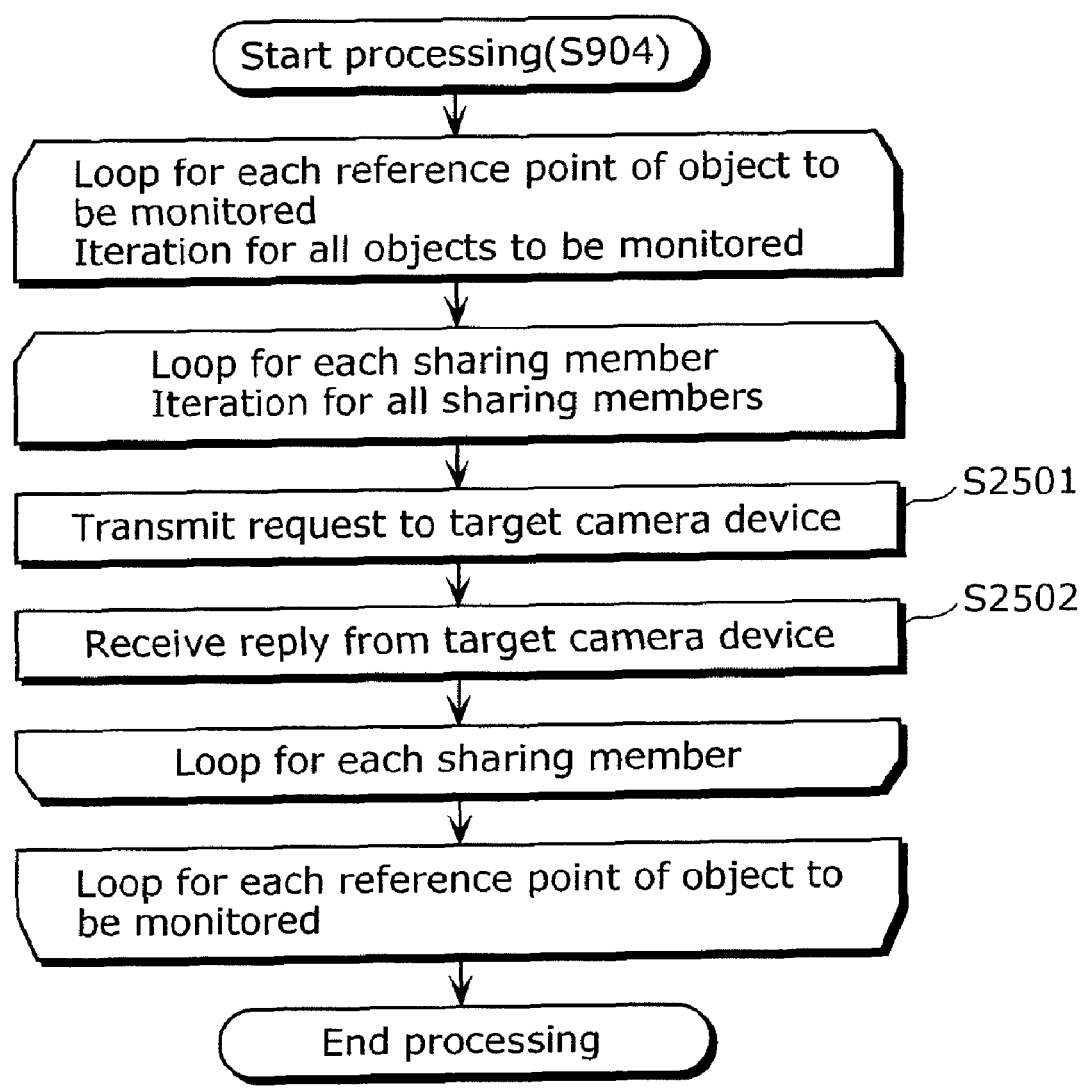
FIG. 22 is a flow chart showing processes of a neighboring communication device information obtaining unit.
Figure 23:
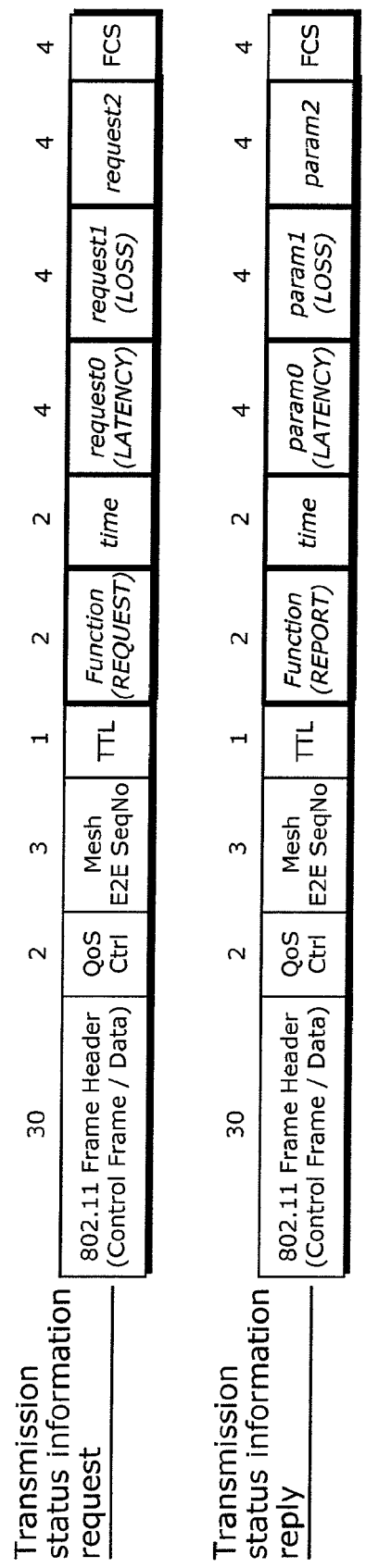
FIG. 23 is a diagram showing an example of a frame structure for gathering transmission status information of a neighboring communication device in the neighboring communication device information obtaining unit.

FIG. 22 shows a flow chart of the process (S904) of exchanging transmission status information with a neighboring camera device. FIG. 23 shows an example of a format of a frame to be transmitted and received. The process is performed as a double-loop iteration process having an outer loop process and an inner loop process. The outer loop process is a process performed for all the reference points including both a fixed reference point and a variable reference point. The inner loop process is a process performed for all the neighboring camera devices corresponding to each reference point. In the sharing group table shown in FIG. 18, an outer loop is structured so as to include a relay device having an identification flag indicating 1 or 2. Furthermore, an inner loop is structure so as to include all of one or more camera devices registered in a sharing member address field of each relay device. The inner loop process includes transmitting a request for transmission status information to a target neighboring camera device (S2501) and gathering the transmission status information of the neighboring camera device by receiving a corresponding reply for transmission status information (S2502).

According to the condition shown in FIG. 18, the outer loop is applied to the relay devices MP3 and MP2. When a reference point is the relay device MP3, the inner loop is applied to the camera devices CAM2 and CAM4. When the reference point is the relay device MP2, the inner loop is applied to the camera devices CAM2, CAM4, and CAM5.

The following will describe, as an example, a process applied to the camera device CAM2 when the reference point is the relay device MP3. The camera device CAM1 stores REQUEST in function field of a transmission status information request frame shown in FIG. 23, and an issuance time of the frame in time field. In addition, the camera device CAM1 stores a value indicating transmission status information to be gathered in request fields. In the figure, LATENCY indicating a round-trip time is stored in the first request field (request0). Moreover, LOSS indicating a frame loss rate is stored in the second request field (request1). This requests that values of RTT and LOSS be sent back. A frame retransmission rate, jitter, a transmission rate, and so on that are transmission status information other than the above may be requested by storing a predetermined value in request field depending on need. The camera device CAM2 receiving the request for transmission status information stores each of the values of RTT and LOSS gathered for the reference point of the camera device CAM2 in param field corresponding to a transmission status information reply frame, and sends back the values to the camera device CAM1. RTT and LOSS measured by the camera device CAM2 are stored in the first param field (param0) and in the second param field (param1), respectively, and are sent back. Processing the double loops allows the camera device CAM1 to obtain values of RTT and LOSS of all the neighboring camera devices for all the reference points.

(Transmission Rate Control Information Correcting Unit 104)

Figure 24:
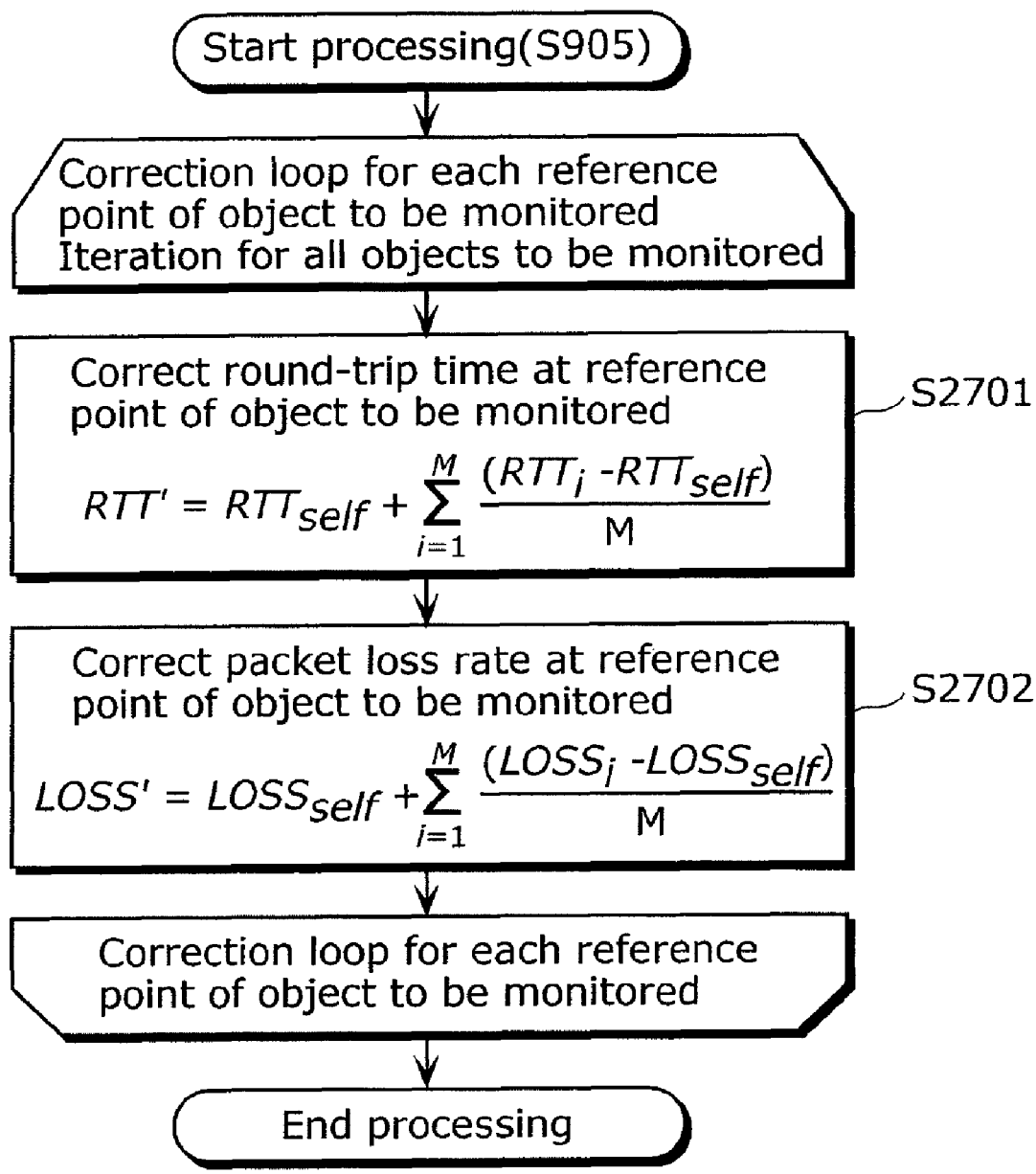
FIG. 24 is a flow chart showing processes of a transmission rate control information correcting unit.

FIG. 24 shows a flow chart corresponding to the process (S905) of correcting transmission status information. The process is performed as an iteration process for all the reference points including both a fixed reference point and a variable reference point. The correction process is performed on the relay device MP3 and the relay device MP2, which are the reference points of the camera device CAM1 and which are recorded in the sharing group table shown in FIG. 18. The transmission rate control information correcting unit 104 corrects RTT according to Equation 4 (S2701).

$$RTT' = RTT_{self} + \sum_{i=1}^{M} \frac{(RTT_i - RTT_{self})}{M}$$ [Equation 4]

M represents the number of neighboring camera devices for a target reference point, RTT' represents a corrected round-trip time, $RTT_{self}$ represents an uncorrected round-trip time, and $RTT_i$ represents RTT of another device which is gathered from each neighboring camera device. Because two neighboring camera devices, the camera devices CAM2 and CAM4, exist for the fixed reference point (the relay device MP3), M=2. When there is no correction term (the right side second term of Equation 4) and $RTT_{self}$ is large, a transmission device attempts to reduce a transmission load by decreasing a transmission rate, regardless of transmission statuses of other transmission devices. For this reason, when $RTT_i$ of each of the other transmission devices is small, the transmission device and the other transmission devices maintain a balance with a low rate and a high rate respectively. The function of the correction term makes it possible to suppress the unilateral reduction in the transmission rate of the transmission device, which inversely results in providing a situation where the transmission rate of each of the other transmission devices is decreased. Consequently, it is possible to achieve quality fairness between reception devices.

The transmission rate control information correcting unit 104 corrects LOSS according to Equation 5 (S2702).

$$LOSS' = LOSS_{self} + \sum_{i=1}^{M} \frac{(LOSS_i - LOSS_{self})}{M}$$ [Equation 5]

M represents the number of neighboring camera devices for a target reference point, LOSS' represents a corrected frame loss rate, $LOSS_{self}$ represents an uncorrected frame loss rate, and $LOSS_i$ represents LOSS of another device which is gathered from each neighboring camera device. Adding the second term of Equations 4 and 5 allows fair transmission rate adjustment between the neighboring camera devices. A transmission rate is corrected by calculating RTT' and LOSS' corresponding to each of reference points.

It is to be noted that although Equations 4 and 5 perform the correction using an average of differences between round-trip times or frame loss rates of the camera device CAM1, the maximum value of a difference or the like may be used. When there is a neighboring communication device having a large transmission status difference, using the maximum value allows strong correction to be performed. Moreover, the correction may be performed based on a transmission status ratio instead of the transmission status difference. Although the transmission status of the neighboring communication device does not contribute to the correction term if the transmission status ratio is close to 1, a correction effect appears if the transmission status deviates from 1.

(Transmission Rate Determining Unit 105)

Figure 25:
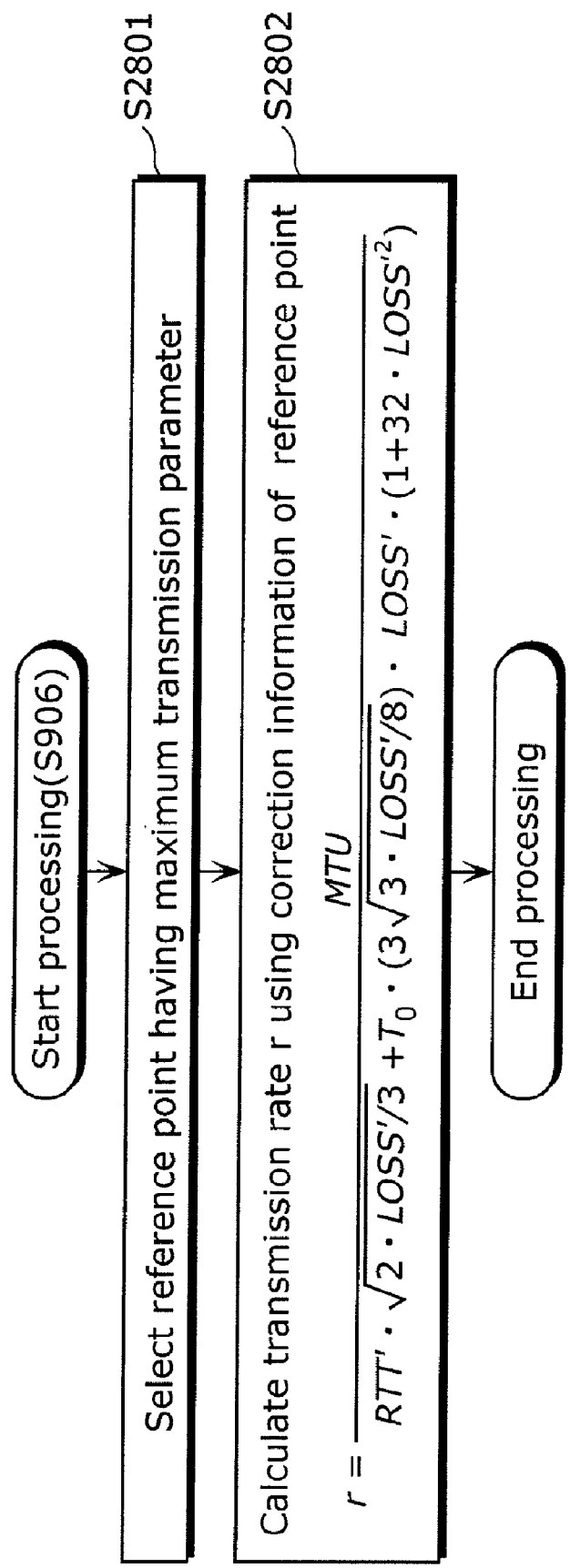
FIG. 25 is a flow chart showing processes of a transmission rate determining unit according to the first embodiment.
Figure 26:
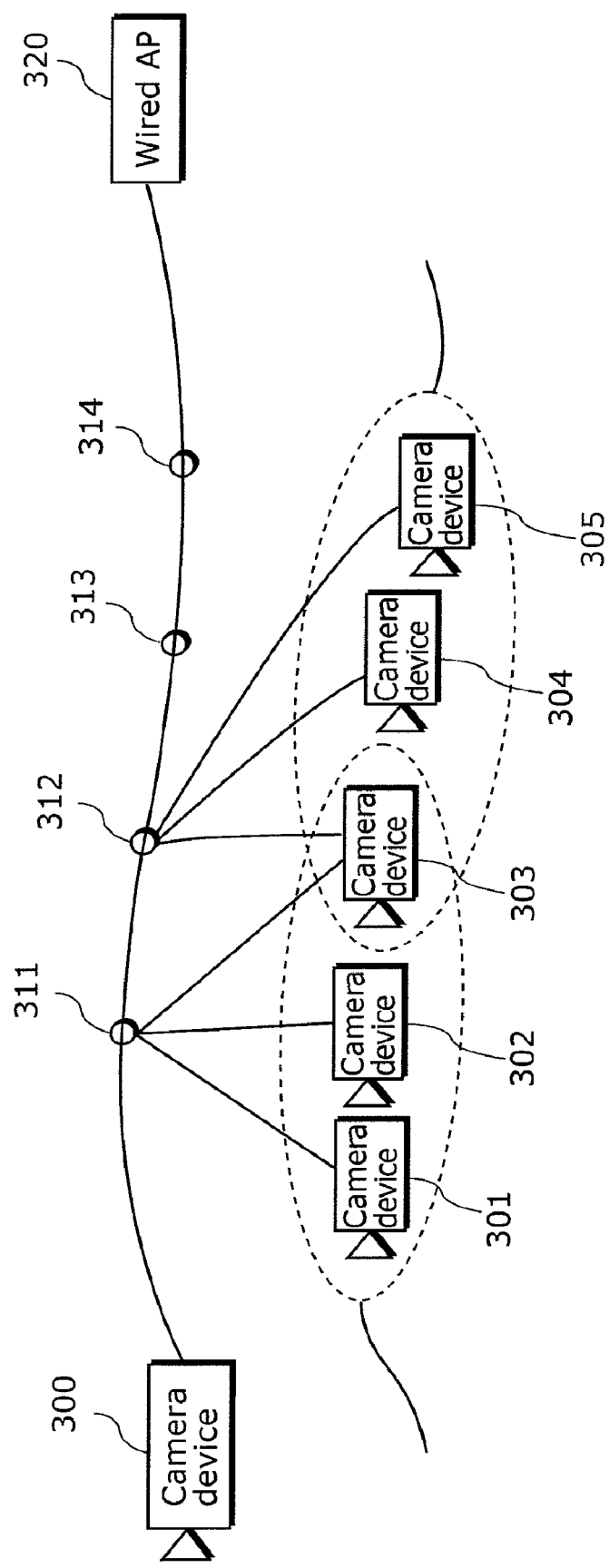
FIG. 26 is a schematic diagram regarding the processes of the transmission rate determining unit according to the first embodiment.

FIG. 25 shows a flow chart of the process (S906) of determining a transmission rate. In the present embodiment, transmission rate adjustment is performed using, as a reference point, a relay device having the worst transmission status among reference points on a path. For instance, it is assumed that, as shown in FIG. 26, the relay devices 311 to 314 are on a transmission path from the camera device 300 to the wired AP 320. Furthermore, it is assumed that the camera devices 301 to 303 and 303 to 305 are connected to the relay device 311 and the relay device 312 respectively. Here, it is assumed that the relay devices 311 and 312 each are selected as a reference point. In this case, the transmission rate determining unit 105 selects, from among the relay devices 311 and 312, a relay device having a worse transmission rate (for example, the relay device 311). Moreover, the transmission rate determining unit 105 calculates transmission rate r using corrected RTT' and LOSS'. Corrected RTT' and LOSS' are calculated by using RU and LOSS of each of camera devices connected to the selected relay device (for instance, the camera devices 301 to 303 connected to the relay device 311). However, the transmission rate r may be calculated, for all the reference points, using RTT' and LOSS' averagely. In addition, the transmission rate r may be calculated using each of RTT' and LOSS' in a weighted average manner made possible by setting a weight to a specific reference point. The following will describe the above process in detail.

The transmission rate determining unit 105 in the camera device CAM1 selects, from among the relay devices MP2 and MP3, which are two reference points, the relay device MP3 having the largest values of RTT' and LOSS' indicating a transmission status as a relay device having the worst transmission status (S2801). Furthermore, the transmission rate determining unit 105 calculates, for the relay device MP3, new transmission rate r according to Equation 6.

$$r = \frac{MTU}{RTT' \cdot \sqrt{2 \cdot LOSS'/3} + T_0 \cdot (3\sqrt{3 \cdot LOSS'/8}) \cdot LOSS' \cdot (1 + 32 \cdot LOSS'^2)}$$ [Equation 6]

MTU represents the maximum transmission unit of a communication line, and can be dynamically obtained using methods such as PMTUD (Path Maximum Transmission Unit Discovery). However, MTU may be typically fixed at 1500 bytes in communication over Ethernet® on a path. Moreover, $T_0$ represents the number of seconds until session timeout in the case of communication with TCP, and is determined by a communication protocol stack of a transport layer to be used. Equation 6 shows an example of determining r using a rate calculation method with TFRC (TCP Friendly Rate Control). However, r may be determined using a rate calculation method other than TFRC. It is to be noted that IETF (Internet Engineering Task Force) formulated the rate calculation method with TFRC as RFC3448. A round-trip time and a frame loss rate to be used in Equation 6 each are a value obtained through correction performed between camera devices each having, on a path, the same relay device having a worsened transmission status. Accordingly, variation in transmission statues each measured for a corresponding one of neighboring camera devices is suppressed, and it becomes possible to prevent unfair assignment of relay resources between the neighboring camera devices.

(Data Transmission Unit 106)

The data transmission unit 106 in the camera device CAM1 sets, as a target rate of an output, the transmission rate r determined by the transmission rate determining unit 105. In addition, the data transmission unit 106 regulates the number of generated codes so that a rate of an image signal to be transmitted from the camera device CAM1 to the wired access point MPP1 is r (S907). Generally, a camera device connected to a network transmits a shot image signal as a digital compressed stream using the Motion JPEG (Joint Photographic Experts Group) standard or the MPEG standard. In such a case, a transmission rate in a trade-off relationship with image quality can be controlled by controlling a quantization coefficient at compression. Moreover, as another method for regulating the number of the generated codes, a frame rate may be changed or a screen size of an image may be adjusted. Further, as the other method, an intra-frame interval or a reference frame interval may be adjusted or a structure of a GOP (Group of Pictures) may be changed.

A series of processes, which ranges from the process (S902) of determining the reference point to the process (S907) of changing a transmission rate shown in FIG. 6, may be performed at a fixed time interval using timer interrupt or the like. Moreover, the series of the processes may be an interrupt process triggered by receiving an update notification from the relay device shown in FIG. 15 or may be performed at timing when the series of the processes and the interrupt process are combined.

Performing the above processes allows a high quality street monitoring camera system to be constructed.

Second Embodiment

The following will describe a street monitoring camera system according to a second embodiment.

In the embodiment 2, a transmission rate is further adjusted based on a time change of a transmission status on a transmission path of the camera device CAM1.

The following will describe in detail an example of a camera device that shoots an image in its neighborhood and that are connected to a network, using the street monitoring camera system shown in FIG. 2. The description of FIG. 2 is the same as in the first embodiment, and thus is not repeated. FIG. 1 is a line block diagram of the inside of the camera device. FIG. 6 is a flow chart showing processes of the camera device. In FIG. 6, because a difference in processes from the first embodiment is only the transmission rate determining unit 105 that performs the transmission rate determination process using transmission path stability, the descriptions of the other components are not repeated.

(Transmission Rate Determining Unit 105)

Figure 27:
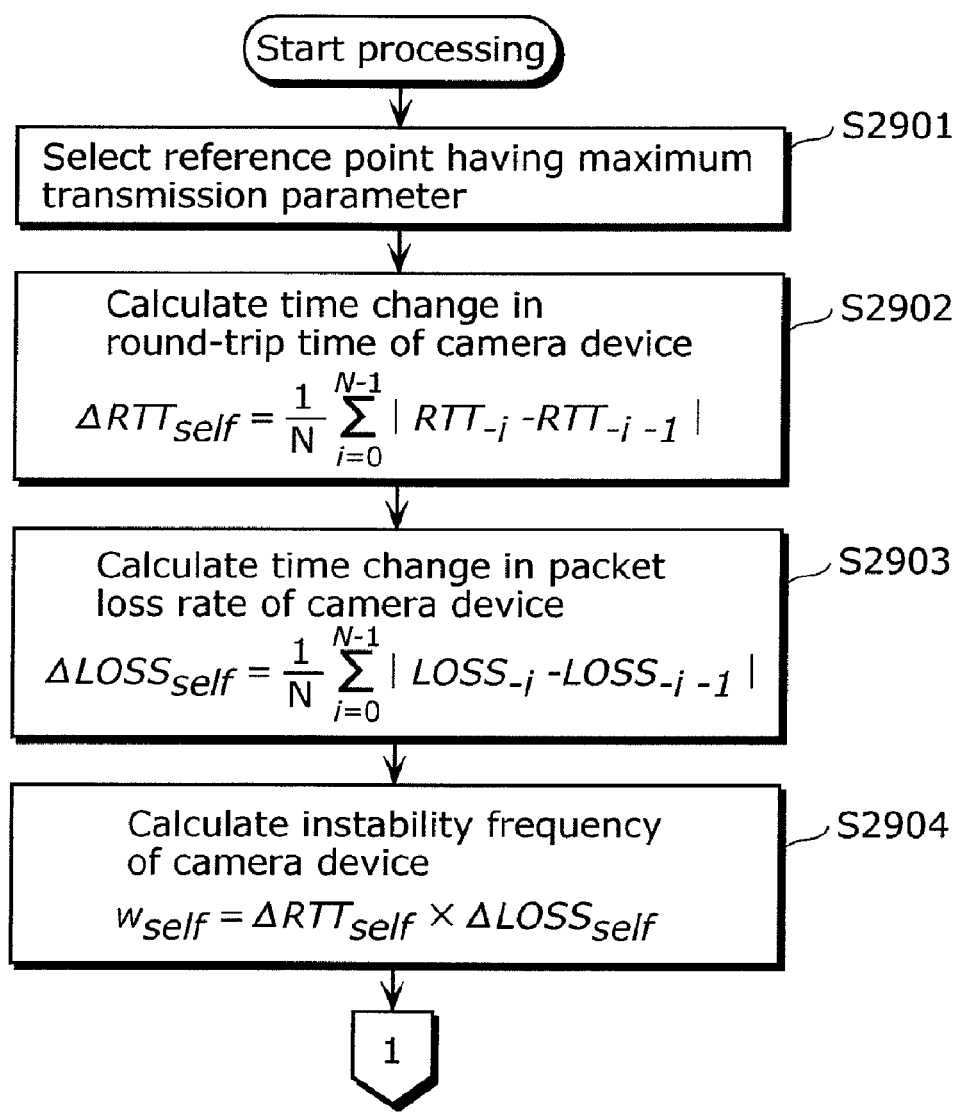
FIG. 27 is a flow chart showing processes of a transmission rate determining unit according to the second embodiment.
Figure 28:
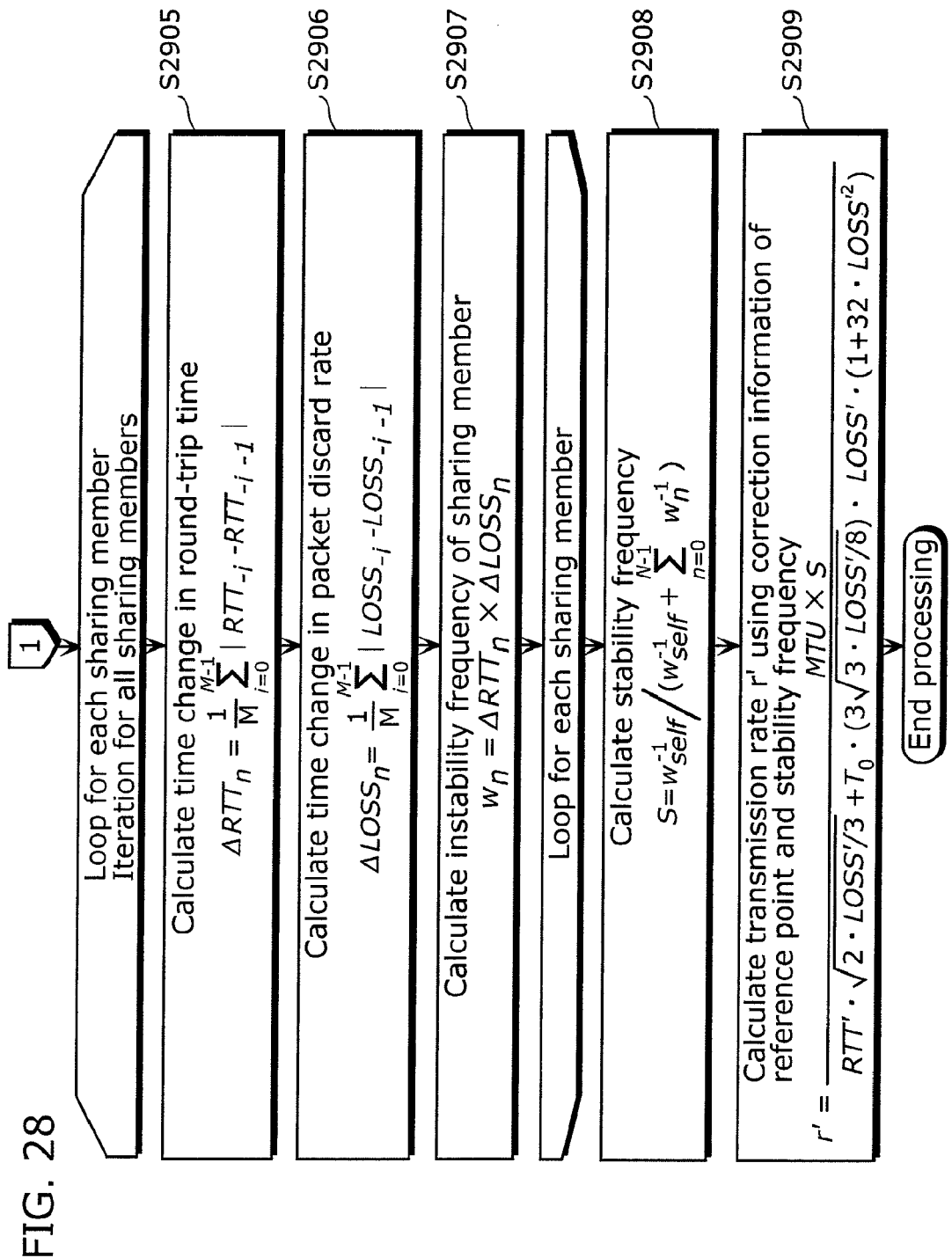
FIG. 28 is a flow chart showing processes of the transmission rate determining unit according to the second embodiment.

FIGS. 27 and 28 show a flow chart of the process (S906) of determining the transmission rate. As with the first embodiment, transmission rate adjustment is performed using, as a reference point, a relay device having the worst transmission status among reference points on a path (S2901). The transmission path stability can be defined as a time change of either a round-trip time or a frame loss rate. Equations 7 and 8 (S2902, S2903) are shown as examples of calculating the time change using corrected RTT' or LOSS'.

$$\Delta RTT_{self} = \frac{1}{N}\sum_{i=0}^{N-1}|RTT_{-i} - RTT_{-i-1}|$$ [Equation 7]

-continued $$\Delta LOSS_{self} = \frac{1}{N}\sum_{i=0}^{N-1}|LOSS_{-i} - LOSS_{-i-1}|$$ [Equation 8]

$\Delta RTT_{self}$ and $\Delta LOSS_{self}$ represent time change values of a round-trip time and a frame loss rate of a transmission path of the currently-used camera device CAM1, respectively. N represents duration considered for calculating transmission path stability. $RTT_0$ and $LOSS_0$ represent a current round-trip time and a current frame loss rate, respectively. $RTT_{-i}$ and $LOSS_{-i}$ represent a past round-trip time and a past frame loss rate that are measured at i time before the current time, respectively. Equations 7 and 8 give the values indicating how much RTT and LOSS have changed during a specified time period, and Equation 9 allows a degree of instability of a transmission path of the camera device CAM1 to be defined using these values (S2904).

$$w_{self} = \Delta RTT_{self} \times \Delta LOSS_{self}$$ [Equation 9]

$w_{self}$ represents a degree of instability which increases as the time change of the transmission status on the transmission path of the camera device CAM1 is larger and more instable. The degree of instability can be similarly obtained for transmission paths of the other neighboring camera devices. In other words, a loop process is performed on each neighboring camera device, which is a sharing member, and the degree of instability is calculated in accordance with Equations 10, 11, and 12 (S2905, S2906, S2907).

$$\Delta RTT_n = \frac{1}{M}\sum_{i=0}^{M-1}|RTT_{-i} - RTT_{-i-1}|$$ [Equation 10]

$$\Delta LOSS_n = \frac{1}{M}\sum_{i=0}^{M-1}|LOSS_{-i} - LOSS_{-i-1}|$$ [Equation 11]

$$w_n = \Delta RTT_n \times \Delta LOSS_n$$ [Equation 12]

$\Delta RTT_n$, $\Delta LOSS_n$, and $w_n$ represent a time change in duration M of a round-trip time of the neighboring camera device, a time change in duration M of a frame loss rate, and a degree of instability of a transmission path, respectively. In considering the sharing group table shown in FIG. 18 as an example and a case where the loop process is performed on a fixed reference point (the relay device MP3), because the camera devices CAM2 and CAM4 correspond to the neighboring camera device, $w_0$ and $w_1$ are calculated. Equation 13 allows a normalized degree of stability S to be defined using W of the camera device CAM1 and $w_n$ of the neighboring camera device (S2908).

$$S = w_{self}^{-1} \Big/ \left( w_{self}^{-1} + \sum_{n=0}^{N-1} w_n^{-1} \right)$$ [Equation 13]

S decreases as the path of the camera device CAM1 is more instable, and approaches 1 as the path of the camera device CAM1 is more stable. Equation 14 gives transmission rate r' adjusted by being coupled with the transmission path stability when the calculation is based on the calculation method with TFRC in the same manner as in the first embodiment (S2909).

$$r' = \frac{MTU \times S}{RTT \cdot \sqrt{2 \cdot LOSS'/3} + T_0 \cdot (3\sqrt{3 \cdot LOSS'/8}) \cdot LOSS'(1 + 32 \cdot LOSS'^2)} \quad \text{[Equation 14]}$$

MTU represents the maximum transmission unit of a communication line. $T_0$ is the number of seconds until session timeout in the case of communication with TCP. Using Equation 14 can increase relay resources to be assigned to a camera device having better transmission stability between the neighboring camera devices including the camera device CAM1. As a result, it is possible to control relay resources to be assigned to a camera device having an instable transmission status, and to improve a line utilization rate.

Third Embodiment

The following will describe an embodiment of a car security system for mutually monitoring mischief to a parked car, using, as an example, an in-vehicle camera device which shoots an image ahead of a vehicle as the communication device described in the first embodiment or the second embodiment.

Figure 29:
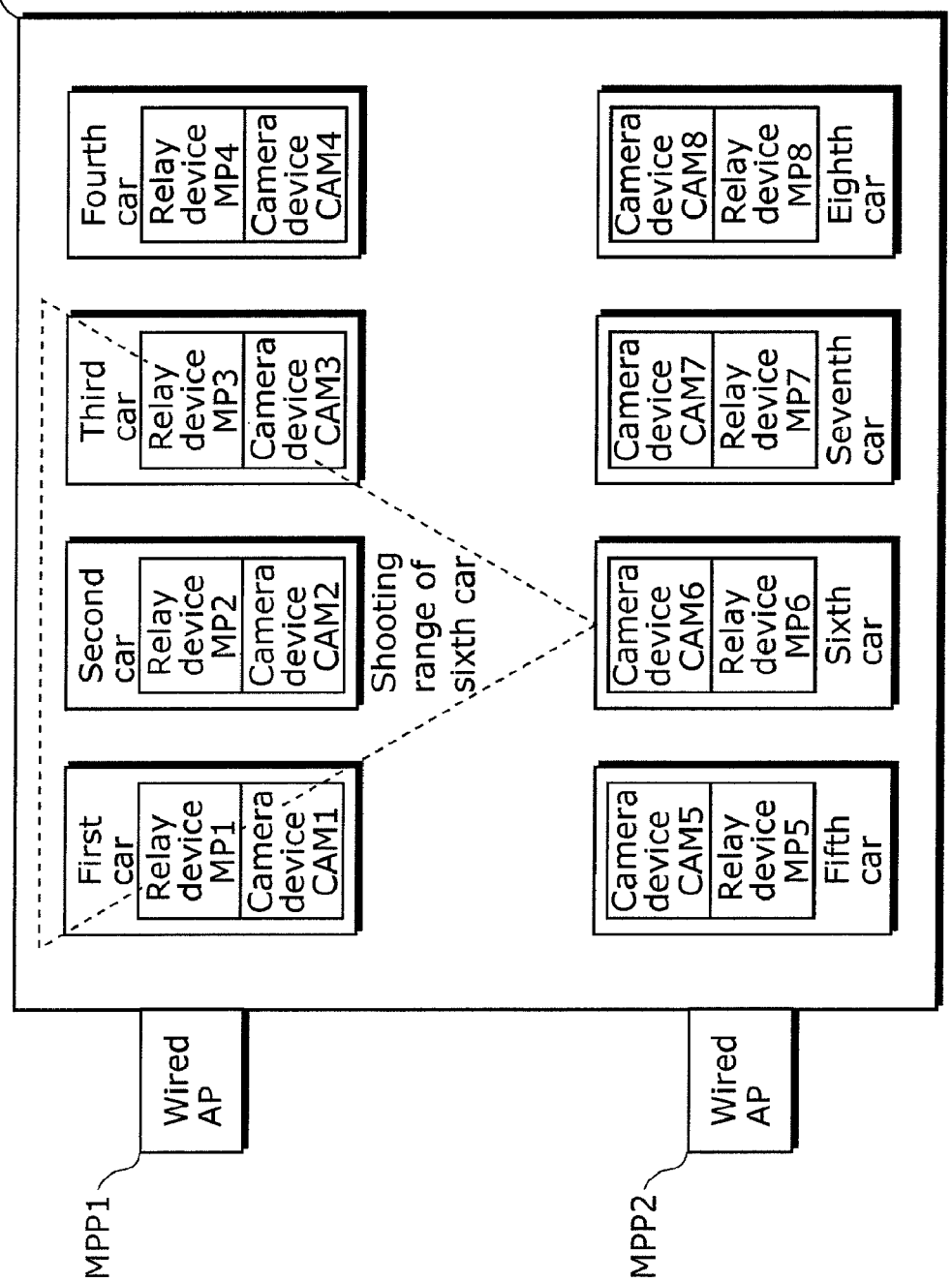
FIG. 29 is a diagram showing a structure of a car security system according to a third embodiment.
Figure 30:
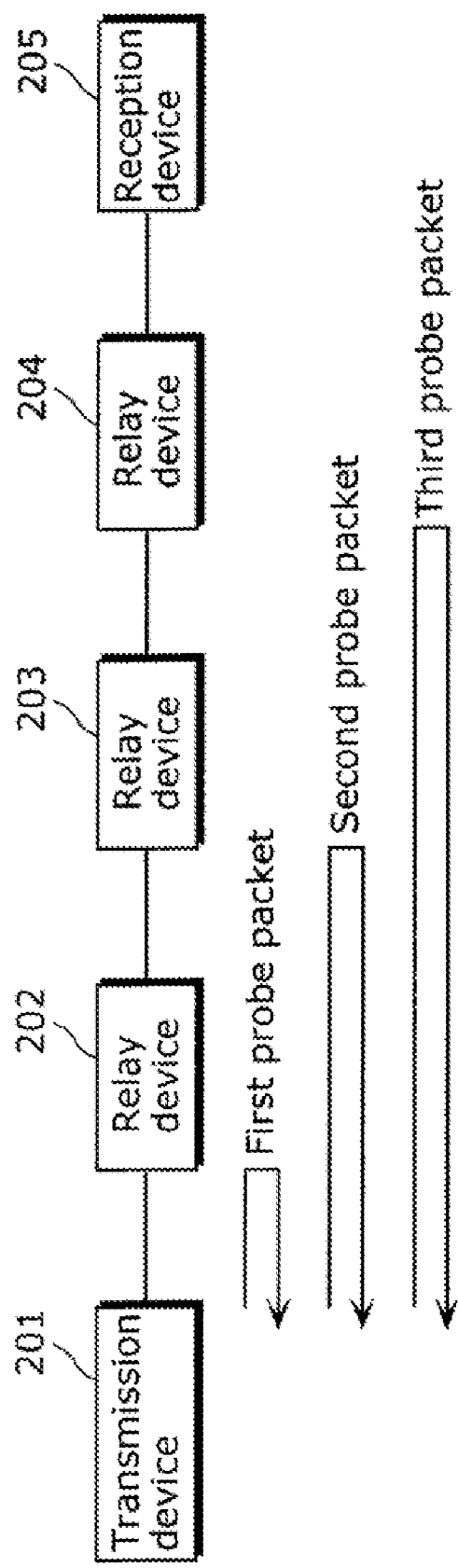
FIG. 30 is a schematic diagram showing a conventional method for measuring transmission status.

FIG. 29 shows a situation where 8 vehicles are parked in a parking lot. Each of the camera devices CAM1 to CAM8 for monitoring ahead of a vehicle are mounted in a corresponding one of the vehicles. Because the internal structure and operations of the camera device are the same as those shown in the first embodiment or the second embodiment, the descriptions are not repeated. Further, each of the relay devices MP1 to MP8 is also mounted in a corresponding one of the vehicles, and can perform wireless ad hoc inter-vehicle communication with the other relay devices mounted in the vehicles and the wired access points MPP1 and MPP2 set up on a side of the parking lot. Short distance wireless communication between a camera device and a relay device in the same vehicle may be performed. In addition, the camera device and the relay device may be connected to each other via a standard bus such as CAN (Controller Area Network). The camera device in each vehicle performs shooting a shooting range ahead of the vehicle using a mobile object detection trigger signal or the like generated by a motion object sensor or the like mounted in the vehicle, and transmits a coded image signal to a monitoring center (not illustrated). In such an application, because each camera device is battery operated, it is effective to perform multi-hop communication via a relay device in a neighboring vehicle for power saving, and a system includes a mesh network. Because the system is used for monitoring to ensure security, it is desirable to provide high transmission quality by using the same structure and operations described in the first embodiment or the second embodiment. As stated above, it is also effective to apply the present invention to the inter-vehicle communication system.

Fourth Embodiment

Although a target value of a transmission rate is calculated using information on RTT or LOSS of a neighboring camera device in the first embodiment or the second embodiment, a difference in reproduced image quality occurs at the same transmission rate depending on an image content. For example, when an image content obtained by a camera device capturing a mobile object and an image content obtained by a camera device capturing only a background are coded simply at the same transmission rate, although fairness between camera devices is assured in terms of a bandwidth to be used, fairness in image quality is not assured. In a common moving picture coding, when the same image quality is assumed, an image signal obtained by imaging a mobile object has the larger number of generated codes. The present embodiment will describe only a difference from the first embodiment in a control method in which not only a transmission rate but also fairness in image quality are included as a measure for evaluation.

(Neighboring Communication Device Information Obtaining Unit 103)

In general, MSE (Mean Square Error) or SNR (Signal to Noise Ratio) is used as an evaluation index when image quality is quantified. MSE which is summation of mean square errors, each of which is calculated from a difference between a pixel signal and a corresponding pixel signal, is determined by Equations 15 and 16.

$$mse = \frac{\sum_{frame} |Pxl_{source} - Pxl_{decoded}|^2}{resolution} \quad \text{[Equation 15]}$$

$$MSE = 10 \cdot \log_{10}\left(\frac{255 \times 255}{mse}\right) \quad \text{[Equation 16]}$$

In Equation 15, a denominator represents a resolution of a frame, and a numerator represents a square sum of a difference between a pixel signal value in an image frame of an image signal coded on a camera device and a corresponding pixel signal value in a corresponding image frame of an image signal after decoding. Equation 16 gives an index transformed into a decibel unit by further taking logarithm of the value determined by Equation 15. The larger the index, the more similar the image quality after decoding is to the image quality before coding and the higher reproducibility is.

When exchanging transmission status information with a neighboring camera device, each of camera devices notifies, in addition to RTT and LOSS, current transmission rate value S and MSE value to each other using a format of a frame shown in FIG. 23.

(Transmission Rate Determining Unit 105)

Each of the camera devices calculates, as a value indicating a difference in image quality between the camera devices, square sum $W_Q$ corresponding to MSE values between a camera device i and each camera device j included in a sharing group, using the transmission status information notified to each other, according to Equation 17. In the moving picture coding, a pixel signal included in a frame is considered a matrix element. Data amount compression is achieved by performing variable length coding by transforming the matrix element into a frequency domain through discrete cosine transform or wavelet transform and by extracting only an effective component from the frequency domain. The extraction of the effective component from the transformed matrix is adjusted with a quantization coefficient, and a result of the adjustment is reflected on image quality. For this reason, $W_Q$ is represented as a function of m which is a quantization coefficient.

$$W_{Qi}(m) = \sum_{j} |MSE_i - MSE_j|^2 \quad \text{[Equation 17]}$$

Moreover, each camera device calculates a value of evaluation function $W_s$ related to each of neighboring camera devices k including the camera device i, according to Equation 18. In the equation, $S_k$ represents presents a current transmission rate of each camera device, and $r_k$ represents a target rate of the camera device k which is calculated with Equation 6. Because the quantization coefficient affects the number of generated codes, as with $W_Q$, $W_S$ is represented as a function of the quantization coefficient.

$$W_S(m) = \left| \sum_k (S_k - r_k) \right|^2 \qquad \text{[Equation 18]}$$

For transmission rate fairness in consideration of image quality of each camera device, W shown in Equation 19 may be considered an evaluation function, and a quantization coefficient m may be controlled according to Equation 20 so that W becomes smaller.

$$W(m) = \alpha \cdot W_Q(m) + \beta \cdot W_S(m) \qquad \text{[Equation 19]}$$

$$\frac{dm}{dt} = -\varepsilon \cdot \frac{\partial W(m)}{\partial m} \qquad \text{[Equation 20]}$$

In the equation, $\alpha$ and $\beta$ each are a coefficient representing a balance between image quality fairness and transmission rate fairness, a value on a closed interval [0, 1], and in a relationship of $\beta=1-\alpha$. For instance, assuming that both $\alpha$ and $\beta$ are equally important for the above fairness, $\alpha=\beta=0.5$ may hold. The balance may be appropriately adjusted, as a system adjustment parameter, to an optimal value depending on application. Furthermore, $\epsilon$ is a coefficient representing a reply speed in controlling the quantization coefficient. The larger $\epsilon$ is, the faster a reply is replied.

(Data Transmission Unit 106)

The data transmission unit 106 codes a shot image signal using a value of the quantization coefficient m controlled by Equation 20.

Performing the above process allows construction of a high quality street monitoring camera system for which image quality is considered.

As described above, according to the first to fourth embodiments, a transmission rate can be determined in consideration of not only a transmission status of a camera device but also transmission statuses of other camera devices sharing a data transmission path. Accordingly, fair band assignment between the camera devices can be achieved. For this reason, a self-distributed system, which includes no central management mechanism for network resources, can incorporate cooperative operations between the camera devices in addition to gathering status information from relay devices. Thus, it is possible to resolve the resource contention between the camera devices and realize low-delay and lossless media transmission.

It should be considered that the embodiments disclosed herein are exemplary in all respects and not restrictive at all. It is intended that the scope of the present invention is indicated by not the above description of the embodiments but claims, and that any change that has equivalent meaning as and fall within the claims are included.

The present invention is characterized in that fair and assured band sharing is achieved even in a network system structured on a centralized band management device or a communication infrastructure which does not include a special band assignment mechanism. In particular, the present invention is useful for high quality media transmission on a system which has difficulty using a method for controlling one-band concentration or a fixed server function such as a wireless ad hoc network, inter-vehicle communication, and ground-to-vehicle communication. Moreover, the present invention is suitable for use in high quality data transmission on a system structured on the Internet or an IP network such as a VPN-connected intranet. Further, the present invention can be used in a system on a network including a band reservation mechanism such as NGN (Next Generation Network) and ATM (Asynchronous Transfer Mode) for improving transmission quality between services multiplexed on the same quality class. Moreover, although streaming transmission of video or audio is common as to media to be transmitted, the present invention is available to applications sensitive to transmission timing including VoIP other than the above. Further, the same mechanism can be applied to not only the network system but also control of a communication bus system in a mesh multi-core structured by connecting processors in mesh.

INDUSTRIAL APPLICABILITY

The present invention is applicable to a communication device included in a self-distributed system which uses, as a communication infrastructure, a packet exchange network represented by an IP (Internet Protocol) network and a wireless ad hoc network, and which lacks a central device controlling the whole system.

The invention claimed is:

1. A communication device connected to a network, said communication device comprising:

a relay device information obtaining unit configured to communicate predetermined data with relay devices on a data transmission network path, and obtain, based on a result of the communication of the predetermined data, self-device transmission status information that is information indicating a transmission status of said communication device;

a neighboring communication device determining unit configured to determine, from other communication devices connected to the network, neighboring communication devices from each of which another-device transmission status information that is information indicating a transmission status of a corresponding one of the other communication devices is to be obtained;

a neighboring communication device information obtaining unit configured to obtain the another-device transmission status information from each of the neighboring communication devices;

a transmission rate control information correcting unit configured to generate, as corrected transmission status information, (i) a corrected self-device round-trip time generated by using, as a round-trip time correction amount, an average of differences each between the self-device round-trip time and an another-device round-trip time to a self-device round-trip time and (ii) a corrected self-device frame loss rate generated by using, as a frame loss rate correction amount, an average of differences each between the self-device frame loss rate and an another-device frame loss rate to a self-device frame loss rate, the self-device round-trip time and the self-device frame loss rate each being an information item included in the self-device transmission status information, and the another-device round-trip time and the another-device frame loss rate each being an information item included in the another-device transmission status information;

a transmission rate determining unit configured to determine a transmission rate of data to be transmitted, based on the corrected transmission status information; and a data transmission unit configured to transmit the data according to the determined transmission rate.

2. The communication device according to claim 1, wherein said transmission rate control information correcting unit is configured to generate, as the corrected transmission status information, (i) the corrected self-device round-trip time generated by adding, as the round-trip time correction amount, the average of the differences each between the self-device round-trip time and the another-device round-trip time to the self-device round-trip time and (ii) the corrected self-device frame loss rate generated by adding, as the frame loss rate correction amount, the average of the differences each between the self-device frame loss rate and the another-device frame loss rate to the self-device frame loss rate, the self-device round-trip time and the self-device frame loss rate each being the information item included in the self-device transmission status information, and the another-device round-trip time and the another-device frame loss rate each being the information item included in the another-device transmission status information.

3. The communication device according to claim 2, wherein said neighboring communication device determining unit is configured to determine, for each of predetermined relay devices on the data transmission path, a communication device commonly connected to the predetermined relay devices, as a neighboring communication device.

4. The communication device according to claim 3, wherein the predetermined relay devices include a relay device located at a position distant from an access point by a predetermined number of hops.

5. The communication device according to claim 3, wherein the predetermined relay devices include a relay device of which an amount of data waiting to be relayed in the relay device exceeds a capacity of the relay device.

6. The communication device according to claim 2, wherein said transmission rate determining unit is configured to increase the transmission rate when a time change of the transmission status of said communication device on the data transmission path is small.

7. The communication device according to claim 2, wherein said transmission rate determining unit is configured to determine the transmission rate of the data to be transmitted, based on corrected transmission status information indicating a worst transmission status among a plurality of corrected transmission status information pieces each of which is associated with a corresponding one of the neighboring communication devices.

8. A method for communicating with another device via a relay device connected to a network, said method comprising:

communicating predetermined data with relay devices on a data transmission network path, and obtaining, based on a result of the communication of the predetermined data, self-device transmission status information that is information indicating a transmission status of a communication device;

determining, from other communication devices connected to the network, neighboring communication devices from each of which another-device transmission status information that is information indicating a transmission status of a corresponding one of the other communication devices is to be obtained;

obtaining the another-device transmission status information from each of the neighboring communication devices;

generating, as corrected transmission status information, (i) a corrected self-device round-trip time generated by adding, as a round-trip time correction amount, an average of differences each between the self-device round-trip time and an another-device round-trip time to a self-device round-trip time and (ii) a corrected self-device frame loss rate generated by adding, as a frame loss rate correction amount, an average of differences each between the self-device frame loss rate and an another-device frame loss rate to a self-device frame loss rate, the self-device round-trip time and the self-device frame loss rate each being an information item included in the self-device transmission status information, and the another-device round-trip time and the another-device frame loss rate each being an information item included in the another-device transmission status information;

determining a transmission rate of data to be transmitted, based on the corrected transmission status information; and transmitting the data according to the determined transmission rate.

9. A program, being embodied on a non-transitory computer-readable storage medium, for communicating with another device via a relay device connected to a network, said program causing a computer to execute:

communicating predetermined data with relay devices on a data transmission network path, and obtaining, based on a result of the communication of the predetermined data, self-device transmission status information that is information indicating a transmission status of a communication device;

determining, from other communication devices connected to the network, neighboring communication devices from each of which another-device transmission status information that is information indicating a transmission status of a corresponding one of the other communication devices is to be obtained;

obtaining the another-device transmission status information from each of the neighboring communication devices;

generating, as corrected transmission status information, (i) a corrected self-device round-trip time generated by adding, as a round-trip time correction amount, an average of differences each between the self-device round-trip time and an another-device round-trip time to a self-device round-trip time and (ii) a corrected self-device frame loss rate generated by adding, as a frame loss rate correction amount, an average of differences each between the self-device frame loss rate and an another-device frame loss rate to a self-device frame loss rate, the self-device round-trip time and the self-device frame loss rate each being an information item included in the self-device transmission status information, and the another-device round-trip time and the another-device frame loss rate each being an information item included in the another-device transmission status information;

determining a transmission rate of data to be transmitted, based on the corrected transmission status information; and transmitting the data according to the determined transmission rate.

* * * * *

UNITED STATES PATENT AND TRADEMARK OFFICE
CERTIFICATE OF CORRECTION

PATENT NO. : 7,836,200 B2
APPLICATION NO. : 12/598260
DATED : November 16, 2010
INVENTOR(S) : Tomoki Ishii et al.

It is certified that error appears in the above-identified patent and that said Letters Patent is hereby corrected as shown below:

On the Cover Page
Item (56) References Cited, under the "OTHER PUBLICATIONS", on page 2, column 2, line 10, "IEFT RFC2250" should read --IETF RFC2250--.

Item (56) References Cited, under the "OTHER PUBLICATIONS", on page 2, column 2, line 12, "IEFT RFC3448" should read --IETF RFC3448--.

Signed and Sealed this
Eighth Day of March, 2011

David J. Kappos
*Director of the United States Patent and Trademark Office*